(12) United States Patent
Li et al.

(10) Patent No.: US 11,046,796 B2
(45) Date of Patent: Jun. 29, 2021

(54) FILMS MADE FROM POLYETHYLENE COMPOSITIONS AND PROCESSES FOR MAKING SAME

(71) Applicant: ExxonMobil Chemical Patents Inc., Baytown, TX (US)

(72) Inventors: Dongming Li, Houston, TX (US); David M. Fiscus, Houston, TX (US); Kevin A. Stevens, Houston, TX (US); Ching-Tai Lue, Sugarland, TX (US); Matthew W. Holtcamp, Huffman, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/632,240

(22) PCT Filed: Jun. 29, 2018

(86) PCT No.: PCT/US2018/040454
§ 371 (c)(1),
(2) Date: Jan. 17, 2020

(87) PCT Pub. No.: WO2019/027605
PCT Pub. Date: Feb. 7, 2019

(65) Prior Publication Data
US 2020/0165366 A1    May 28, 2020

Related U.S. Application Data

(60) Provisional application No. 62/674,871, filed on May 22, 2018, provisional application No. 62/541,360, filed on Aug. 4, 2017.

(51) Int. Cl.
*C08F 210/16*   (2006.01)
*B29C 48/00*    (2019.01)
(Continued)

(52) U.S. Cl.
CPC .......... *C08F 210/16* (2013.01); *B29C 48/022* (2019.02); *C08J 5/18* (2013.01);
(Continued)

(58) Field of Classification Search
None
See application file for complete search history.

(56) References Cited

U.S. PATENT DOCUMENTS 6,242,545 B1   6/2001   Jejelowo et al.
6,248,845 B1   6/2001   Loveday et al.
(Continued)

FOREIGN PATENT DOCUMENTS

WO   20180106388 A1   6/2018

OTHER PUBLICATIONS

Yiyong He, et al. (2014), "Terminal and Internal Unsaturations in Poly(ethylene-co-1-octene)", Macromolecules vol. 47, No. 12, Jun. 24, 2014, pp. 3782-3790.

*Primary Examiner* — Richard A Huhn
(74) *Attorney, Agent, or Firm* — ExxonMobil Chemical Patents Inc.—Law Department

(57) ABSTRACT

The present disclosure provides films made of polyethylene (PE) compositions. In at least one embodiment, a film includes a polyethylene composition, comprising: ethylene content and from 0 to 25 mol % of $C_3$-$C_{40}$ olefin comonomer content, based upon the total weight of the polyethylene composition, the polyethylene composition having a total internal plus terminal unsaturation greater than 0.7 unsaturations per 1000 carbon atoms, the film having: an Elmendorf Tear value in the machine direction of from 10 g/mil to 300 g/mil, and a Dart Drop Impact of from 100 g/mil to 800 g/mil. In at least one embodiment, the present disclosure provides for processes to make a film.

16 Claims, 2 Drawing Sheets

(51) Int. Cl.
  *C08J 5/18*   (2006.01)
  *B29K 23/00*  (2006.01)
  *C08F 10/02*  (2006.01)
  *B29D 7/01*   (2006.01)

(52) U.S. Cl.
  CPC ............ *B29D 7/01* (2013.01); *B29K 2023/08* (2013.01); *C08F 10/02* (2013.01); *C08F 2500/00* (2013.01); *C08J 2323/08* (2013.01)

(56) References Cited

U.S. PATENT DOCUMENTS

| | | |
|---|---|---|
| 6,528,597 B2 | 3/2003 | Loveday et al. |
| 6,936,675 B2 | 8/2005 | Szul et al. |
| 6,956,088 B2 | 10/2005 | Farley et al. |
| 7,172,816 B2 | 2/2007 | Szul et al. |
| 7,179,876 B2 | 2/2007 | Szul et al. |
| 7,381,783 B2 | 6/2008 | Loveday et al. |
| 8,247,065 B2 | 8/2012 | Best et al. |
| 8,378,043 B2 | 2/2013 | Graham et al. |
| 8,476,392 B2 | 7/2013 | Kolb et al. |
| 10,611,867 B2 * | 4/2020 | Holtcamp ............. B32B 27/327 |
| 2013/0029125 A1 | 1/2013 | Tse et al. |
| 2015/0291748 A1 | 10/2015 | Malakoff |
| 2018/0155474 A1 | 6/2018 | Holtcamp et al. |
| 2020/0165366 A1 | 5/2020 | Li et al. |

\* cited by examiner

FILMS MADE FROM POLYETHYLENE COMPOSITIONS AND PROCESSES FOR MAKING SAME

CROSS-REFERENCE OF RELATED APPLICATIONS

This application is a National Stage filing of Patent Cooperation Treaty Application No. PCT/US2018/040454, which claims the benefit of Ser. No. 62/541,360, filed Aug. 4, 2017, and Ser. No. 62/674,871, tiled May 22, 2018 the disclosures of which are hereby incorporated by reference in their entireties.

FIELD OF THE INVENTION

The disclosure relates to films comprising a polyethylene (PE) composition and processes for forming films.

BACKGROUND OF THE INVENTION

Olefin polymerization catalysts are of great use in industry to produce polyolefin polymers. Hence, there is interest in finding new catalyst systems to use in polymerization processes that increase the commercial usefulness of the catalyst systems and allow the production of polyolefin polymers having improved properties or a new combination of properties.

In particular, much effort has been placed in understanding how the comonomer is distributed along the polymer carbon chain or simply polymer chain of a polyolefin polymer. For example, the composition distribution of an ethylene alpha-olefin copolymer refers to the distribution of comonomer (short chain branches) among the molecules that comprise the polyethylene polymer. When the amount of short chain branches varies among the polymer carbon chain, the polymer or resin is said to have a Broad Composition Distribution (BCD). When the amount of comonomer per about 1000 carbons is similar among the polyethylene molecules of different polymer chain lengths or molecular weights, the composition distribution is said to be "narrow" or have a Narrow Composition Distribution (NCD).

The composition distribution influences the properties of copolymers, for example, extractables content, environmental stress crack resistance, heat sealing, dart drop impact resistance, and tear resistance or strength. The composition distribution of a polyolefin may be readily measured by suitable methods, for example, Temperature Rising Elution Fractionation (TREF) or Crystallization Analysis Fractionation (CRYSTAF). See, for example, U.S. Pat. No. 8,378,043, Col. 3 and Col. 4.

Ethylene alpha-olefin copolymers may be produced in a low pressure reactor, utilizing, for example, solution, slurry, and/or gas phase polymerization processes. Polymerization takes place in the presence of activated catalyst systems such as those employing a Ziegler-Natta catalyst, a chromium based catalyst, a vanadium catalyst, a metallocene catalyst, a mixed catalyst (i.e., two or more different catalysts co-supported on the same carrier such as a bimodal catalyst), other advanced catalysts, or combinations thereof. In general, these catalysts when used in a catalyst system all produce a variety of polymer chains in a polyolefin polymer composition that vary in molecular weight and comonomer incorporation. In some cases, this variation becomes a "signature" to the catalyst itself.

For example, a polyolefin's composition distribution is largely dictated by the type of catalyst used. For example, Broad Composition Distribution or BCD refers to polymers in which the length of the molecules would be substantially the same but the amount of the comonomer would vary along the length, for example, for an ethylene-hexene copolymer, hexene distribution varies from low to high while the molecular weight is roughly the same or the Polydispersity Index (PDI) is narrow.

Polymers made with Zeigler Natta catalysts are considered to be "conventional" in which the composition distribution is broad but the high molecular weight fractions are higher density (i.e., less comonomer) than the lower molecular weight fraction (high comonomer).

In contrast, metallocene catalysts can produce a polyolefin polymer composition with an NCD. A metallocene catalyst is generally a metal complex of a transitional metal, such as a Group 4 metal, and one or more cyclopentadienyl (Cp) ligands or rings. As stated above, NCD generally refers to the comonomer being evenly distributed or not vary much along the polymer chain. An illustration is provided below.

A third distribution is used to describe a polyolefin polymer composition which is Broad Orthogonal Composition Distribution (BOCD). This is a polyolefin polymer composition in which the comonomer is incorporated predominantly in the high molecular weight chains. A substituted hafnocene catalyst has been noted to produce this type of distribution. See, for example, U.S. Pat. Nos. 6,242,545, 6,248,845, 6,528,597, 6,936,675, 6,956,088, 7,172,816, 7,179,876, 7,381,783, 8,247,065, 8,378,043, 8,476,392; U.S. Publication No. 2015/0291748; and Ser. No. 62/461,104, filed Feb. 20, 2017, entitled Supported Catalyst Systems and Processes for Use Thereof. An illustration is provided below. This distribution has been noted for its improved physical properties, for example, ease in fabrication of end-use articles as well as stiffness and toughness in multiple applications such as films that can be measured by dart drop impact resistance and tear resistance or strength.

As disclosed in U.S. Pat. No. 8,378,043, BOCD refers to incorporating the comonomer predominantly in the high molecular weight chains. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights.

The term "BOCD structure" means a structure in which the content of the comonomer such as alpha olefins is mainly high at a high molecular weight main chain, that is, a novel structure in which the content of a short chain branching (SCB) is increased as moving toward the high molecular weight. The '593 Patent also teaches a BOCD Index. The BOCD Index may be defined by the following equation:

$$\text{BOCD Index} = (\text{Content of SCB at the high molecular weight side} - \text{Content of SCB at the low molecular weight side})/(\text{Content of SCB at the low molecular weight side}),$$

wherein the "Content of SCB at the high molecular weight side" means the content of the SCB (the number of branches/1000 carbon atoms) included in a polymer chain having a molecular weight of Mw of the polyolefin or more and 1.3×Mw or less, and the "Content of SCB at the low molecular weight side" means the content of the SCB (the number of branches/1000 carbon atoms) included in a polymer chain having a molecular weight of 0.7×Mw of the polyolefin or more and less than Mw. The BOCD Index defined by the equation above may be in the range of 1 to 5, such as 2 to 4, more such as 2 to 3.5. See, also, FIG. 1 and FIG. 2 of the '593 Patent (characterizing BOCD polymer structures using GPC-FTIR data).

BOCD behavior in a polymer composition has been associated with a good balance of mechanical and optical properties and has been an important goal in the development of new polymer products. A change in polymer stiffness will not affect processability, and vice versa. However, stiffness and processability are inversely related with toughness. Thus, to improve stiffness and toughness while maintaining good processability remains a challenge.

There is a need for films made from polyethylene compositions that possess, for example, BOCD characteristics to produce films or other useful articles with a good balance of one or more of high stiffness, toughness, and processability.

SUMMARY OF THE INVENTION

The present disclosure provides for films comprising polyethylene (PE) composition(s). In a class of embodiments, a film comprises a polyethylene composition, comprising: an ethylene content and from 0 to 25 mol % of a $C_3$-$C_{40}$ olefin comonomer content, based upon the total weight of the polyethylene composition, the polyethylene composition having a total internal plus terminal unsaturation greater than 0.7 unsaturations per 1000 carbon atoms, wherein the film has: an Elmendorf Tear value in the machine direction of from 10 g/mil to 300 g/mil, and a Dart Drop Impact of from 100 g/mil to 800 g/mil.

In another class of embodiments, the present disclosure provides for a process to form a film as disclosed herein.

DETAILED DESCRIPTION OF THE INVENTION

Figure 1:
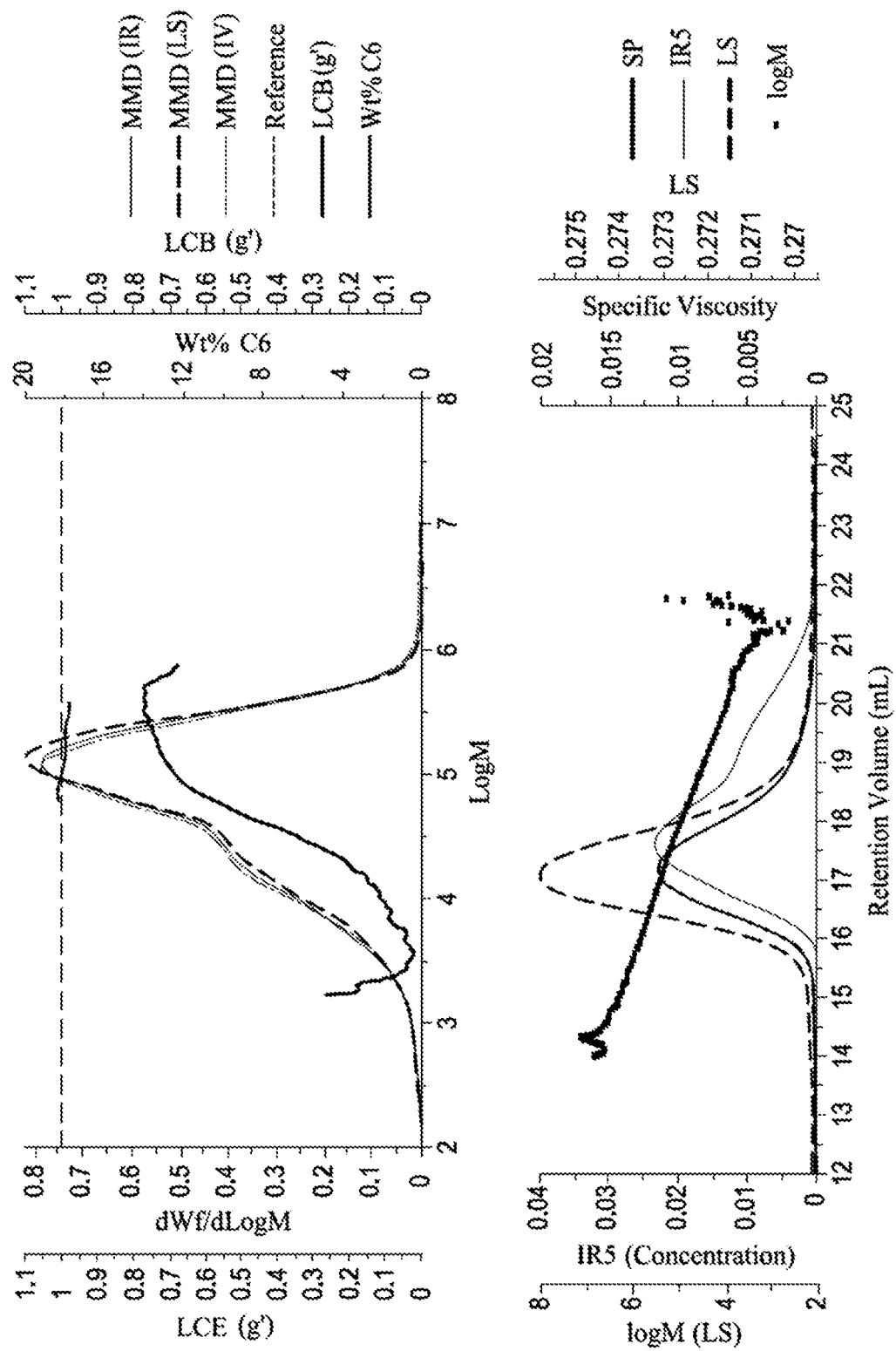
FIG. 1 is a graph illustrating a gel permeation chromatography spectrum and cross fractionation chromatography spectrum of a polymer composition of the present disclosure, according to one embodiment.

Before the present compounds, components, compositions, films, and/or methods are disclosed and described, it is to be understood that unless otherwise indicated the present disclosure is not limited to specific compounds, components, compositions, reactants, reaction conditions, ligands, metallocene structures, catalyst structures, or the like, as such may vary, unless otherwise specified. It is also to be understood that the terminology used herein is for the purpose of describing particular embodiments only and is not intended to be limiting.

The present disclosure provides films comprising polyethylene (PE) composition(s). Catalyst systems and their use in polymerization processes to produce polyolefin polymers (for use in films), such as polyethylene polymers and polypropylene polymers, include a bridged group 4 metallocene compound, a 2,6-bis(imino)pyridyl iron complex, an optional support material and an optional activator. Catalyst systems of the present disclosure can provide increased activity or enhanced polymer properties, to increase conversion or comonomer incorporation, or to alter comonomer distribution. Catalyst systems and processes of the present disclosure can provide ethylene polymers having the unique properties of high stiffness, high toughness and good processability. The present disclosure is directed to films comprising polyolefins prepared in gas phase, slurry phase, or solution polymerizations and utilizing catalyst systems of the present disclosure. The present disclosure provides films comprising ethylene polymers (and PE compositions) that can exhibit, for example, BOCD characteristics to produce films or other useful articles with a good balance of one or more of high stiffness, toughness, and processability.

In at least one embodiment, a film has a polyethylene composition, comprising: a polyethylene composition, comprising ethylene content and from 0 to 25 mol % of $C_3$-$C_{40}$ olefin comonomer content, based upon the total weight of the polyethylene composition, the polyethylene composition having a total internal plus terminal unsaturation greater than 0.7 unsaturations per 1000 carbon atoms, the film having: an Elmendorf Tear value in the machine direction of from 10 g/mil to 300 g/mil, and a Dart Drop Impact of from 100 g/mil to 800 g/mil.

The polyethylene composition of the film can have one or more of: (i) a density from 0.900 to 0.940 g/cc, (ii) a g'vis of 0.97 or greater, (iii) a g'vis of 0.99 or greater, (iv) a $T_{75}$-$T_{25}$ greater than 20° C., (v) a vinyl content of greater than 50% of the total unsaturation, (vi) a terminal unsaturation:internal saturation ratio of from 1 to 4, (vii) an RCI,m of from 50 to 100, (viii) from 6 mol % to 10 mol % of comonomer content, (ix) wherein the $C_3$-$C_{40}$ olefin comonomer is hexene, (x) an Mw/Mn value of from 6 to 9, and/or (xi) a melt index ratio ($I_{21}/I_2$) of from 20 to 40.

The film can have one or more of: (i) an average of the MD and TD 1% secant modulus of from 35,000 psi to 60,000 psi, such as from 40,000 psi to 50,000 psi, (ii) a Dart Drop Impact of from 400 g/mil to 1,000 g/mil, such as from 900 g/mil to 1,000 g/mil or from 400 g/mil to 650 g/mil or from 650 g/mil to 725 g/mil, (iii) an Elmendorf Tear value in the machine direction of from 50 g/mil to 250 g/mil, such as from 125 g/mil to 175 g/mil, (iv) an Elmendorf Tear value in the transverse direction of from 400 g/mil to 1,000 g/mil, such as from 600 g/mil to 700 g/mil, (v) a Tensile Strength in the machine direction of from 3,000 psi to 1 2,000 psi, such as from 7,500 psi to 8,500 psi, (vi) a Tensile Strength in the transverse direction of from 3,000 psi to 12,000 psi, such as from 7,500 psi to 9,000 psi, (vii) a Tensile Strength at Yield in the machine direction of from 500 psi to 3,000 psi, such as from 1,250 psi to 1,750 psi, (viii) a Tensile Strength at Yield in the transverse direction of from 1,000 psi to 3,000 psi, such as from 1,750 psi to 2,250 psi, (ix) an Elongation at Break in the machine direction of from 200% to 600%, such as from 350% to 425%, (x) an Elongation at Break in the transverse direction of from 400% to 800%, such as from 550% to 650%, (xi) a haze of from about 7% to about 11%, and/or (xii) the film is a blown film or a cast film.

The present disclosure further provides for processes of forming films, comprising: extruding the polyethylene composition through a die at a die rate of from 0.3 kg/mm-hr to 2 kg/mm-hr, such as 0.73 kg/mm-hr to 1.69 kg/mm-hr; and obtaining the film.

For purposes of this disclosure and the claims hereto, the numbering scheme for the Periodic Table Groups is according to the new notation of the IUPAC Periodic Table of Elements.

As used herein, "olefin polymerization catalyst(s)" refers to any catalyst, such as an organometallic complex or compound that is capable of coordination polymerization addition where successive monomers are added in a monomer chain at the organometallic active center.

Melt index ratio (MIR) is High Load Melt Index (HLMI) divided by Melt Index (MI) as determined by ASTM D1238. Melt index (MI), also referred to as I2, reported in g/10 min, is determined according to ASTM D1238, 190° C., 2.16 kg load. High load melt index (HLMI), also referred to as I21, reported in g/10 min is determined according to ASTM D1238, 190° C., 21.6 kg load.

The terms "substituent," "radical," "group," and "moiety" may be used interchangeably.

As used herein, and unless otherwise specified, the term "$C_n$," means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

For purposes of the present disclosure, a "catalyst system" is a combination of at least two catalyst compounds, an activator, and a support material. The catalyst systems may further comprise one or more additional catalyst compounds. The terms "mixed catalyst system," "dual catalyst system," "mixed catalyst," and "supported catalyst system" may be used interchangeably herein with "catalyst system." For the purposes of the present disclosure, when catalyst systems are described as comprising neutral stable forms of the components, it is well understood by one of ordinary skill in the art, that the ionic form of the component is the form that reacts with the monomers to produce polymers.

As used herein, the term "metallocene compound" includes compounds having two or three Cp ligands (cyclopentadienyl and ligands isolobal to cyclopentadienyl) bound to at least one Zr or Hf metal atom, and one or more leaving group(s) bound to the at least one metal atom.

For purposes of the present disclosure in relation to all metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

The term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal. "Complex," as used herein, is also often referred to as "catalyst precursor," "pre-catalyst," "catalyst," "catalyst compound," "metal compound," "metal catalyst compound", "transition metal compound," or "transition metal complex." These words are used interchangeably. "Activator" and "cocatalyst" are also used interchangeably.

The terms "hydrocarbyl radical," "hydrocarbyl" and "hydrocarbyl group" are used interchangeably throughout this document. Likewise, the terms "group," "radical," and "substituent" are also used interchangeably in this document. For purposes of the present disclosure, "hydrocarbyl radical" is defined to be $C_1$-$C_{10}$ radicals, that may be linear, branched, or cyclic, and when cyclic, aromatic or non-aromatic.

The term "contact product" or "the product of the combination of" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another or react in the manner as theorized. Similarly, the term "contacting" is used herein to refer to materials which may be blended, mixed, slurried, dissolved, reacted, treated, or otherwise contacted in some other manner.

"BOCD" refers to a Broad Orthogonal Composition Distribution in which the comonomer of a copolymer is incorporated predominantly in the high molecular weight chains or species of a polyolefin polymer or composition. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights of polymer chains. BOCD has been described, for example, in U.S. Pat. No. 8,378,043, Col. 3, line 34, bridging Col. 4, line 19, and U.S. Pat. No. 8,476,392, line 43, bridging Col. 16, line 54.

The breadth of the composition distribution is characterized by the $T_{75}$-$T_{25}$ value, wherein $T_{25}$ is the temperature at which 25% of the eluted polymer is obtained and $T_{75}$ is the temperature at which 75% of the eluted polymer is obtained in a TREF experiment as described herein. The composition distribution is further characterized by the $F_{80}$ value, which is the fraction of polymer that elutes below 80° C. in a TREF-LS experiment as described herein. A higher $F_{80}$ value indicates a higher fraction of comonomer in the polymer molecule. An orthogonal composition distribution is defined by a $M_{60}/M_{90}$ value that is greater than 1, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

In a class of embodiments, the polymers as described herein may have a BOCD characterized in that the $T_{75}$-$T_{25}$ value is 1 or greater, 2.0 or greater, 2.5 or greater, 4.0 or greater, 5.0 or greater, 7.0 or greater, 10.0 or greater, 11.5 or greater, 15.0 or greater, 17.5 or greater, 20.0 or greater, 25.0 or greater, 30.0 or greater, 35.0 or greater, 40.0 or greater, or 45.0 or greater, wherein $T_{25}$ is the temperature at which 25% of the eluted polymer is obtained and $T_{75}$ is the temperature at which 75% of the eluted polymer is obtained in a TREF experiment as described herein.

The polymers as described herein may further have a BOCD characterized in that $M_{60}/M_{90}$ value is 1.5 or greater, 2.0 or greater, 2.25 or greater, 2.50 or greater, 3.0 or greater, 3.5 or greater, 4.0 or greater, 4.5 or greater, or 5.0 or greater, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

Additionally, the polymers as described herein may further have a BOCD characterized in that $F_{80}$ value is 1% or greater, 2% or greater, 3% or greater, 4% or greater, 5% or greater, 6% or greater, 7% or greater, 10% or greater, 11% or greater, 12% or greater, or 15% or greater, wherein $F_{80}$ is the fraction of polymer that elutes below 80° C.

For purposes of the present disclosure, unless otherwise indicated, the term "substituted" means that a hydrogen group has been replaced with a heteroatom, or a heteroatom containing group. For example, substituted hydrocarbyl radicals are radicals in which at least one hydrogen atom of the hydrocarbyl radical has been substituted with at least one functional group such as Cl, Br, F, I, $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like (where $R^*$ is H or a $C_1$ to $C_{20}$ hydrocarbyl group), or where at least one heteroatom has been inserted within a hydrocarbyl ring.

The term "ring atom" means an atom that is part of a cyclic ring structure. By this definition, a benzyl group has six ring atoms and tetrahydrofuran has 5 ring atoms.

A "ring carbon atom" is a carbon atom that is part of a cyclic ring structure. By this definition, a benzyl group has six ring carbon atoms and para-methylstyrene also has six ring carbon atoms.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S.

The term "arylalky" is an aryl-substituted alkyl radical and may be used interchangeably with the term "aralkyl." Examples of aralkyl include benzyl, diphenylmethyl, triphenylmethyl, phenylethyl, and diphenylethyl.

A "heterocyclic ring" is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

As used herein the term "aromatic" also refers to pseudo-aromatic heterocycles which are heterocyclic substituents that have similar properties and structures (nearly planar) to aromatic heterocyclic ligands, but are not by definition aromatic; likewise, the term aromatic also refers to substituted aromatics.

The term "continuous" means a system that operates without interruption or cessation. For example, a continuous process to produce a polymer would be one where the reactants are continually introduced into one or more reactors and polymer product is continually withdrawn.

A "solution polymerization" means a polymerization process in which the polymerization is conducted in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, *Ind. Eng. Chem. Res.*, 2000, 29, 4627.

A bulk polymerization means a polymerization process in which the monomers and/or comonomers being polymerized are used as a solvent or diluent using little or no inert solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as 0 wt %.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of $gPgcat^{-1}\ hr^{-1}$. "Conversion" is the amount of monomer that is converted to polymer product, and is reported as mol % and is calculated based on the polymer yield and the amount of monomer fed into the reactor. "Catalyst activity" is a measure of the level of activity of the catalyst and is reported as the mass of product polymer (P) produced per mole (or mmol) of catalyst (cat) used (kgP/molcat or gP/mmolCat), and catalyst activity can also be expressed per unit of time, for example, per hour (hr).

An "olefin," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For purposes of the present disclosure, an ethylene polymer having a density of 0.86 $g/cm^3$ or less is referred to as an ethylene elastomer or elastomer; an ethylene polymer having a density of more than 0.86 to less than 0.910 $g/cm^3$ is referred to as an ethylene plastomer or plastomer; an ethylene polymer having a density of 0.910 to 0.940 $g/cm^3$ is referred to as a low density polyethylene; and an ethylene polymer having a density of more than 0.940 $g/cm^3$ is referred to as a high density polyethylene (HDPE). Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 $g/cm^3$).

Polyethylene in an overlapping density range, i.e., 0.890 to 0.930 g/cm$^3$, such as from 0.915 to 0.930 g/cm$^3$, which is linear and does not contain long chain branching is referred to as "linear low density polyethylene" (LLDPE) and has been produced with conventional Ziegler-Natta catalysts, vanadium catalysts, or with metallocene catalysts in gas phase reactors and/or in slurry reactors and/or in solution reactors. "Linear" means that the polyethylene has no long chain branches, which can be referred to as a branching index (g'vis) of 0.97 or above, such as 0.98 or above. Branching index, $g'_{vis}$, is measured by GPC-4D as described below.

Olefin Polymerization Catalysts

For purposes of the present disclosure, ethylene shall be considered an alpha-olefin (α-olefin).

As used herein, $M_n$ is number average molecular weight, $M_w$ is weight average molecular weight, and $M_z$ is z average molecular weight, wt % is weight percent, and mol % is mole percent. Unless otherwise noted, all average molecular weights (e.g., Mw, Mn, Mz) are reported in units of g/mol. Molecular weight distribution (MWD), also referred to as polydispersity index (PDI), is defined to be Mw divided by Mn.

The following abbreviations may be used herein: Me is methyl, Et is ethyl, t-Bu and $^t$Bu are tertiary butyl, iPr and $^i$Pr are isopropyl, Cy is cyclohexyl, THF (also referred to as thf) is tetrahydrofuran, Bn is benzyl, Ph is phenyl, Cp is cyclopentadienyl, Cp* is pentamethyl cyclopentadienyl, Ind is indenyl, Flu is fluorenyl, and MAO is methylalumoxane.

The present disclosure provides a supported catalyst system comprising: a bridged group 4 metallocene compound, an iron compound, specifically a 2,6-bis(imino)pyridyl iron complex, a support material and an activator. The bridged group 4 metallocene compound is represented by the formula (A):

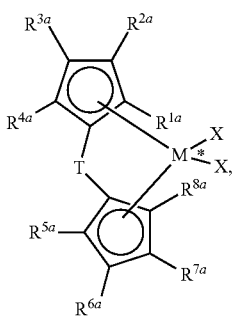

(A)

wherein:
M* is a group 4 metal;
each of $R^{1a}$, $R^{2a}$ and $R^{4a}$ is independently hydrogen, alkoxide or $C_1$ to $C_{40}$ substituted or unsubstituted hydrocarbyl;
$R^{3a}$ is independently hydrogen, alkoxide, $C_1$ to $C_{40}$ substituted or unsubstituted hydrocarbyl, or —$R^{9a}$—SiR'$_3$ or —$R^{9a}$—CR'$_3$ where $R^{9a}$ is $C_1$ to $C_4$ hydrocarbyl, and each R' is independently $C_1$ to $C_{20}$ substituted or unsubstituted hydrocarbyl and at least one R' is $C_1$ to $C_{20}$ substituted or unsubstituted hydrocarbyl;
each of $R^{5a}$, $R^{6a}$, and $R^{8a}$ is independently hydrogen, halide, alkoxide or $C_1$ to $C_{40}$ substituted or unsubstituted hydrocarbyl;
$R^{7a}$ is —$R^{9a}$—SiR'$_3$ or —$R^{9a}$—CR'$_3$ where $R^{9a}$ is $C_1$ to $C_4$ hydrocarbyl, and each R' is independently $C_1$ to $C_{20}$ substituted or unsubstituted hydrocarbyl, and at least one R' is H;

T is a bridging group; and
each X is independently a univalent anionic ligand, a diene ligand, an alkylidene ligand, or two Xs are joined to form a metallocyclic ring.

The iron complex is represented by formula (B):

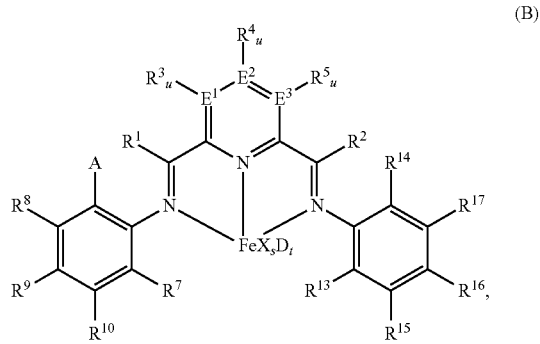

(B)

wherein:
A is chlorine, bromine, iodine, —CF$_3$ or —OR$^{11}$;
each of R$^1$ and R$^2$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six- or seven-membered heterocyclyl comprising at least one atom selected from the group consisting of N, P, O and S;
wherein each of R$^1$ and R$^2$ is optionally substituted by halogen, —NR$^{11}$$_2$, —OR$^{11}$ or —SiR$^{12}$$_3$;
wherein R$^1$ optionally bonds with R$^3$, and R$^2$ optionally bonds with R$^5$, in each case to independently form a five-, six- or seven-membered ring;
R$^7$ is a $C_1$-$C_{20}$ alkyl;
each of R$^3$$_u$, R$^4$$_u$, R$^5$$_u$, R$^8$, R$^9$, R$^{10}$, R$^{15}$, R$^{16}$, and R$^{17}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, —NR$^{11}$$_2$, —OR$^{11}$, halogen, —SiR$^{12}$$_3$ or five-, six- or seven-membered heterocyclyl comprising at least one atom selected from the group consisting of N, P, O, and S;
wherein R$^3$, R$^4$, R$^5$, R$^7$, R$^8$, R$^9$, R$^{10}$, R$^{15}$, R$^{16}$, and R$^{17}$ are optionally substituted by halogen, —NR$^{11}$$_2$, —OR$^{11}$ or —SiR$^{12}$$_3$;
wherein R$^3$ optionally bonds with R$^4$, R$^4$ optionally bonds with R$^5$, R$^7$ optionally bonds with R$^{10}$, R$^{10}$ optionally bonds with R$^9$, R$^9$ optionally bonds with R$^8$, R$^{17}$ optionally bonds with R$^{16}$, and R$^{16}$ optionally bonds with R$^{15}$, in each case to independently form a five-, six- or seven-membered carbocyclic or heterocyclic ring, the heterocyclic ring comprising at least one atom from the group consisting of N, P, O and S;
R$^{13}$ is $C_1$-$C_{20}$-alkyl bonded with the aryl ring via a primary or secondary carbon atom;
R$^{14}$ is chlorine, bromine, iodine, —CF$_3$ or —OR$^{11}$, or $C_1$-$C_{20}$-alkyl bonded with the aryl ring; each R$^{11}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —SiR$^{12}$$_3$, wherein R$^{11}$ is optionally substituted by halogen, or two R$^{11}$ radicals optionally bond to form a five- or six-membered ring;
each R$^{12}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two $R^{12}$ radicals optionally bond to form a five- or six-membered ring;

each of $E^1$, $E^2$, and $E^3$ is independently carbon, nitrogen or phosphorus;

each u is independently 0 if $E^1$, $E^2$, and/or $E^3$ is nitrogen or phosphorus and is 1 if $E^1$, $E^2$, and/or $E^3$ is carbon;

each X is independently fluorine, chlorine, bromine, iodine, hydrogen, $C_1$-$C_{20}$-alkyl, $C_2$-$C_{10}$-alkenyl, $C_6$-$C_{20}$-aryl, arylalkyl where alkyl has from 1 to 10 carbon atoms and aryl has from 6 to 20 carbon atoms, —$NR^{18}_2$, —$OR^{18}$, —$SR^{18}$, —$SO_3R^{18}$, —$OC(O)R^{18}$, —CN, —SCN, β-diketonate, —CO, —$BF_4^-$, —$PF_6^-$ or bulky non-coordinating anions, and the radicals X can be bonded with one another;

each $R^{18}$ is independently hydrogen, $C_1$-$C_{20}$-alkyl, $C_2$-$C_{20}$-alkenyl, $C_6$-$C_{20}$-aryl, arylalkyl where alkyl has from 1 to 10 carbon atoms and aryl has from 6 to 20 carbon atoms, or —$SiR^{19}_3$, wherein $R^{18}$ can be substituted by halogen or nitrogen- or oxygen-containing groups and two $R^{18}$ radicals optionally bond to form a five- or six-membered ring;

each $R^{19}$ is independently hydrogen, $C_1$-$C_{20}$-alkyl, $C_2$-$C_{20}$-alkenyl, $C_6$-$C_{20}$-aryl or arylalkyl where alkyl has from 1 to 10 carbon atoms and aryl has from 6 to 20 carbon atoms, wherein $R^{19}$ can be substituted by halogen or nitrogen- or oxygen-containing groups or two $R^{19}$ radicals optionally bond to form a five- or six-membered ring;

s is 1, 2, or 3;

D is a neutral donor; and t is 0 to 2, such as 0, 1, or 2.

The present disclosure further provides a process for polymerization of olefin monomers which comprises contacting one or more monomers with the above supported catalyst systems.

In embodiments, the above two catalyst components can have different hydrogen responses (each having a different reactivity toward hydrogen) during the polymerization process. Hydrogen is often used in olefin polymerization to control the final properties of the polyolefin. The first catalyst component can show a more negative response to changes of hydrogen concentration in reactor than the second catalyst component. Owing to, inter alia, the differing hydrogen response of the catalyst components in the supported catalyst systems, the properties of resulting polymer are controllable. Changes of hydrogen concentration in reactor may affect molecular weight, molecular weight distributions, and other properties of the resulting polyolefin when using a combination of such two catalyst components. Thus, the present disclosure further provides a multi-modal polyolefin obtained from polymerizations using the above supported catalyst systems.

In at least one embodiment, catalyst A is a good comonomer (such as hexene) incorporator and yields polyethylene with higher molecular weight than catalyst B which under similar conditions yields lower molecular weight than catalyst A. Catalyst B can also incorporate less comonomer (such as hexene) under similar reaction conditions. When catalyst A and catalyst B are combined on one support, an in-reactor blend of polyethylene is produced with a mix of low and high density resins in which the higher density resin (higher melting) is combined with lower density higher molecular weight resin. Catalyst A may be a single isomer or a combination of isomers, e.g., 2, 3, 4, 5, or 6 isomers, such as 1 or 2 isomers.

The two transition metal catalyst compounds may be used in any ratio. Preferred molar ratios of (A) a bridged group 4 metallocene compound to (B) iron compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact catalyst compounds chosen, the method of activation, and the end product desired. In a particular embodiment, when using the two catalyst compounds, where both are activated with the same activator, useful mole percents, based upon the molecular weight of the catalyst compounds, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

For purposes of the present disclosure, one metallocene catalyst compound is considered different from another if they differ by at least one atom. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of the present disclosure, e.g., rac-bis(1-methylindenyl)hafnium dimethyl is considered to be the same as meso-bis(1-methyl-indenyl)hafnium dimethyl. Thus, as used herein, a single metallocene catalyst component having a racemic and/or meso isomer does not, itself, constitute two different metallocene catalyst components.

The present disclosure further provides a process to produce ethylene polymer compositions comprising: i) contacting in a single reaction zone, in the gas phase or slurry phase, ethylene and $C_3$ to $C_{20}$ comonomer with a catalyst system comprising a support, an activator, and the catalysts described above, and obtaining an ethylene polymer having: a) an RCI,m greater than 30 and an Mw/Mn of greater than 3; or b) an RCI,m greater than 50 and an Mw/Mn of greater than 5. Without wishing to be bound by theory, it is believed that the ethylene polymer produced herein (i.e., an in-situ ethylene polymer composition) has at least two polymer components where the first component is derived from the catalyst represented by formula A and has more comonomer (such as hexene) and higher Mw as compared to the second component derived from the catalyst represented by formula B which has less comonomer (such as hexene) and lower Mw as compared to the first component as determined by 4D GPC.

Bridged Metallocenes

In aspects of the present disclosure, the supported catalyst systems comprise a first catalyst compound which is a transition metal complex represented by the formula (A):

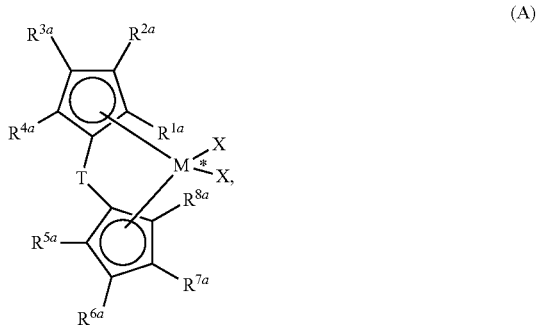

(A)

wherein:

M* is a group 4 metal;

each of $R^{1a}$, $R^{2a}$, and $R^{4a}$ is independently hydrogen, alkoxide or $C_1$ to $C_{40}$ substituted or unsubstituted hydrocarbyl;

$R^{3a}$ is independently hydrogen, alkoxide, $C_1$ to $C_{40}$ substituted or unsubstituted hydrocarbyl, or —$R^{9a}$—SiR'$_3$ or —$R^{9a}$—CR'$_3$ where $R^{9a}$ is $C_1$ to $C_4$ hydrocarbyl, and each R' is independently $C_1$ to $C_{20}$ substituted or unsubstituted hydrocarbyl and at least one R' is $C_1$ to $C_{20}$ substituted or unsubstituted hydrocarbyl;

each of $R^{5a}$, $R^{6a}$, and $R^{8a}$ is independently hydrogen, halide, alkoxide or $C_1$ to $C_{40}$ substituted or unsubstituted hydrocarbyl;

$R^{7a}$ is —$R^{9a}$—SiR'$_3$ or —$R^{9a}$—CR'$_3$ where $R^{9a}$ is a $C_1$ to $C_4$ hydrocarbyl, and each R' is independently $C_1$ to $C_{20}$ substituted or unsubstituted hydrocarbyl, T is a bridging group; and each X is independently a univalent anionic ligand, a diene ligand, an alkylidene ligand, or two Xs are joined to form a metallocyclic ring.

In at least one embodiment, each $R^{1a}$, $R^{2a}$, and $R^{4a}$ is independently hydrogen, or a substituted $C_1$ to $C_{12}$ hydrocarbyl group or an unsubstituted $C_1$ to $C_{12}$ hydrocarbyl group, such as each $R^{1a}$, $R^{2a}$, and $R^{4a}$ is independently a $C_1$ to $C_{20}$ alkyl group, such as hydrogen, methyl, ethyl, propyl, butyl, pentyl, hexyl, or an isomer thereof, such as hydrogen or methyl.

In at least one embodiment M* of formula (A) is Hf or Zr, each $R^{1a}$, $R^{2a}$, $R^{3a}$ and $R^{5a}$ is a $C_1$ to $C_{20}$ alkyl group and $R^{4a}$ is —CH$_2$SiR'$_3$ or —CH$_2$CR'$_3$ where R' is $C_1$ to $C_{20}$ alkyl or aryl.

In at least one embodiment, $R^{3a}$ is hydrogen, or a substituted $C_1$ to $C_{12}$ hydrocarbyl group or an unsubstituted $C_1$ to $C_{12}$ hydrocarbyl group, such as $R^{3a}$ is a $C_1$ to $C_{20}$ alkyl group, such as hydrogen, methyl, ethyl, propyl, butyl, pentyl, hexyl, or an isomer thereof, such as hydrogen or methyl, or $R^{3a}$ is —$R^{20}$—SiR'$_3$ or is —$R^{20}$—CR'$_3$ where $R^{20}$ is hydrogen or a $C_1$ to $C_4$ hydrocarbyl (such as CH$_2$; CH$_2$CH$_2$, (Me)CHCH$_2$, (Me)CH), and each R' is independently hydrogen or a $C_1$ to $C_{20}$ substituted or unsubstituted hydrocarbyl, such a substituted $C_1$ to $C_{12}$ hydrocarbyl group or an unsubstituted $C_1$ to $C_{12}$ hydrocarbyl group, such as methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R' is not H, alternatively 2 R' are not H, alternatively 3 R' are not H.

Alternatively, $R^{3a}$ is —CH$_2$—SiMe$_3$, —CH$_2$—SiEt$_3$, —CH$_2$—SiPr$_3$, —CH$_2$—SiBu$_3$, —CH$_2$—SiCy$_3$, —CH$_2$—C(CH$_3$)$_3$, —CH$_2$—CH(CH$_3$)$_2$, —CH$_2$CPh$_3$, —CH$_2$(C$_6$Me$_5$), —CH$_2$—C(CH$_3$)$_2$Ph, —CH$_2$—C(Cy)Ph$_2$, —CH$_2$—SiH(CH$_3$)$_2$, —CH$_2$SiPh$_3$, —CH$_2$—Si(CH$_3$)$_2$Ph, —CH$_2$—Si(CH$_3$)$_2$Ph, —CH$_2$—Si(CH$_3$)Ph$_2$, —CH$_2$—Si(Et)$_2$Ph, —CH$_2$—Si(Et)Ph$_2$, —CH$_2$—Si(CH$_2$)$_3$Ph, —CH$_2$—Si(CH$_2$)$_4$Ph, —CH$_2$—Si(Cy)Ph$_2$, or —CH$_2$—Si(Cy)$_2$Ph.

Alternatively, each of $R^{1a}$, $R^{2a}$, $R^{3a}$, and $R^{4a}$ is not H.

In at least one embodiment, each of $R^{5a}$, $R^{6a}$ and $R^{8a}$ is independently hydrogen, or a substituted $C_1$ to $C_{12}$ hydrocarbyl group or an unsubstituted $C_1$ to $C_{12}$ hydrocarbyl group, such as a $C_1$ to $C_{20}$ alkyl group, such as hydrogen, methyl, ethyl, propyl, butyl, pentyl, hexyl, or an isomer thereof, such as a hydrogen or methyl.

In at least one embodiment, $R^{7a}$ is —$R^{20}$—SiR'$_3$ or is —$R^{20}$—CR'$_3$ where $R^{20}$ is hydrogen or a $C_1$ to $C_4$ hydrocarbyl (such as CH$_2$, CH$_2$CH$_2$, (Me)CHCH$_2$, (Me)CH), and each R' is independently hydrogen or a $C_1$ to $C_{20}$ substituted or unsubstituted hydrocarbyl, such a substituted $C_1$ to $C_{12}$ hydrocarbyl group or an unsubstituted $C_1$ to $C_{12}$ hydrocarbyl group, such as methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R' is not H, alternatively 2 R' are not H, alternatively 3 R' are not H;

Alternatively, $R^{7a}$ is —CH$_2$—SiMe$_3$, —CH$_2$—SiEt$_3$, —CH$_2$—SiPr$_3$, —CH$_2$—SiBu$_3$, —CH$_2$—SiCy$_3$, —CH$_2$—C(CH$_3$)$_3$, —CH$_2$—CH(CH$_3$)$_2$, —CH$_2$CPh$_3$, —CH$_2$(C$_6$Me$_5$), —CH$_2$—C(CH$_3$)$_2$Ph, —CH$_2$—C(Cy)Ph$_2$, —CH$_2$—SiH(CH$_3$)$_2$, —CH$_2$SiPh$_3$, —CH$_2$—Si(CH$_3$)$_2$Ph, —CH$_2$—Si(CH$_3$)Ph$_2$, —CH$_2$—Si(Et)$_2$Ph, —CH$_2$—Si(Et)Ph$_2$, —CH$_2$—Si(CH$_2$)$_3$Ph, —CH$_2$—Si(CH$_2$)$_4$Ph, —CH$_2$—Si(Cy)Ph$_2$, or —CH$_2$—Si(Cy)$_2$Ph.

Alternatively, $R^{7a}$ is n-propyl, n-butyl, n-pentyl or n-hexyl.

Alternatively, $R^{3a}$ and $R^{7a}$ are independently —$R^{20}$—SiR'$_3$ or is —$R^{20}$—CR'$_3$ where $R^{20}$ is a $C_1$ to $C_4$ hydrocarbyl (such as CH$_2$, CH$_2$CH$_2$, (Me)CHCH$_2$, (Me)CH), and each R' is independently hydrogen, or a $C_1$ to $C_{20}$ substituted or unsubstituted hydrocarbyl, such as a substituted $C_1$ to $C_{12}$ hydrocarbyl group or an unsubstituted $C_1$ to $C_{12}$ hydrocarbyl group, such as methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl; alternatively $R^3$ and $R^9$ are selected from the group consisting of: —CH$_2$—SiMe$_3$, —CH$_2$—SiEt$_3$, —CH$_2$—SiPr$_3$, —CH$_2$—SiBu$_3$, —CH$_2$—SiCy$_3$, —CH$_2$—C(CH$_3$)$_3$, —CH$_2$—CH(CH$_3$)$_2$, —CH$_2$CPh$_3$, —CH$_2$(C$_6$Me$_5$), —CH$_2$—C(CH$_3$)$_2$Ph, —CH$_2$—C(Cy)Ph$_2$, —CH$_2$—SiH(CH$_3$)$_2$, —CH$_2$SiPh$_3$, —CH$_2$—Si(CH$_3$)$_2$Ph, —CH$_2$—Si(CH$_3$)Ph$_2$, —CH$_2$—Si(Et)$_2$Ph, —CH$_2$—Si(Et)Ph$_2$, —CH$_2$—Si(CH$_2$)$_3$Ph, —CH$_2$—Si(CH$_2$)$_4$Ph, —CH$_2$—Si(Cy)Ph$_2$, or —CH$_2$—Si(Cy)$_2$Ph.

Alternatively, each X may be, independently, a halide, a hydride, an alkyl group, an alkenyl group or an arylalkyl group.

Alternatively, each X is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), such as each X is independently selected from halides, aryls and $C_1$ to $C_5$ alkyl groups, such as each X is a phenyl, methyl, ethyl, propyl, butyl, pentyl, or chloro group.

In at least one embodiment, T is a bridging group containing at least one Group 13, 14, 15, or 16 element, in particular boron or a Group 14, 15, or 16 element. Examples of suitable bridging groups include P(=S)R*, P(=Se)R*, P(=O)R*, R*$_2$C, R*$_2$Si, R*$_2$Ge, R*$_2$CCR*$_2$, R*$_2$CCR*$_2$CR*$_2$, R*$_2$CCR*$_2$CR*$_2$CR*$_2$, R*C=CR*, R*C=CR*CR*$_2$, R*$_2$CCR*=CR*CR*$_2$, R*C=CR*CR*=CR*, R*C=CR*CR*$_2$, R*$_2$CSiR*$_2$, R*$_2$SiSiR*$_2$, R*$_2$SiOSiR*$_2$, R*$_2$CSiR*$_2$CR*$_2$, R*$_2$SiCR*$_2$SiR*$_2$, R*C=CR*SiR*$_2$, R*$_2$CGeR*$_2$, R*$_2$GeGeR*$_2$, R*$_2$CGeR*$_2$CR*$_2$, R*$_2$GeCR*$_2$GeR*$_2$, R*$_2$SiGeR*$_2$, R*C=CR*GeR*$_2$, R*B, R*$_2$C—BR*, R*$_2$C—BR*—CR*$_2$, R*$_2$C—O—CR*$_2$, R*$_2$CR*$_2$C—O—CR*$_2$CR*$_2$, R*$_2$C—O—CR*$_2$CR*$_2$, R*$_2$C—O—CR*=CR*, R*$_2$C—S—CR*$_2$, R*$_2$CR*$_2$C—S—

CR*$_2$CR*$_2$, R*$_2$C—S—CR*$_2$CR*$_2$, R*$_2$C—S—CR*=CR*, R*$_2$C—Se—CR*$_2$, R*$_2$CR*$_2$C—Se—CR*$_2$CR*$_2$, R*$_2$C—Se—CR*$_2$CR*$_2$, R*$_2$C—Se—CR*=CR*, R*$_2$C—N=CR*, R*$_2$C—NR*—CR*$_2$, R*$_2$C—NR*—CR*$_2$CR*$_2$, R*$_2$C—NR*—CR*=CR*, R*$_2$CR*$_2$C—NR*—CR*$_2$CR*$_2$, R*$_2$C—P=CR*, R*$_2$C—PR*—CR*$_2$, O, S, Se, Te, NR*, PR*, AsR*, SbR*, O—O, S—S, R*N—NR*, R*P—PR*, O—S, O—NR*, O—PR*, S—NR*, S—PR*, and R*N—PR* where R* is hydrogen or a C$_1$-C$_{20}$ containing hydrocarbyl, substituted hydrocarbyl, halocarbyl, substituted halocarbyl, silylcarbyl or germylcarbyl substituent and optionally two or more adjacent R* may join to form a substituted or unsubstituted, saturated, partially unsaturated or aromatic, cyclic or polycyclic substituent. Exemplary examples for the bridging group T include CH$_2$, CH$_2$CH$_2$, SiMe$_2$, SiPh$_2$, SiMePh, Si(CH$_2$)$_3$, Si(CH$_2$)$_4$, O, S, NPh, PPh, NMe, PMe, NEt, NPr, NBu, PEt, PPr, Me$_2$SiOSiMe$_2$, and PBu. In at least one embodiment in any embodiment of any formula described herein, T is represented by the formula ER$^d_2$ or (ER$^d_2$)$_2$, where E is C, Si, or Ge, and each R$^d$ is, independently, hydrogen, halogen, C$_1$ to C$_{20}$ hydrocarbyl (such as methyl, ethyl, propyl, butyl, pentyl, hexyl, heptyl, octyl, nonyl, decyl, undecyl, or dodecyl) or a C$_1$ to C$_{20}$ substituted hydrocarbyl, and two R$^d$ can form a cyclic structure including aromatic, partially saturated, or saturated cyclic or fused ring system. For example, T is a bridging group comprising carbon or silica, such as dialkylsilyl, such as T is selected from CH$_2$, CH$_2$CH$_2$, C(CH$_3$)$_2$, SiMe$_2$, cyclotrimethylenesilylene (Si(CH$_2$)$_3$), cyclopentamethylenesilylene (Si(CH$_2$)$_5$) and cyclotetramethylenesilylene (Si(CH$_2$)$_4$).

Useful asymmetric catalysts can be such that a mirror plane cannot be drawn through the metal center and the cyclopentadienyl moieties bridged to the metal center are structurally different.

Catalyst compounds represented by formula (A) that are particularly useful in at least one embodiment of the present disclosure include one or more of: Rac/meso-Me$_2$Si(3-Me$_3$Si—CH$_2$-Cp)$_2$HfMe$_2$; rac-Me$_2$Si(3-Me$_3$Si—CH$_2$-Cp)$_2$HfMe$_2$; rac/meso-Ph$_2$Si(3-Me$_3$Si—CH$_2$-Cp)$_2$HfMe$_2$; rac/meso-PhMeSi(3-Me$_3$Si—CH$_2$-Cp)$_2$HfMe$_2$; rac/meso-(CH$_2$)$_4$Si(3-Me$_3$Si—CH$_2$-Cp)$_2$HfMe$_2$; rac/meso-(CH$_2$)$_3$Si(3-Me$_3$Si—CH$_2$-Cp)$_2$HfMe$_2$; Me(H)Si(3-Me$_3$Si—CH$_2$-Cp)$_2$HfMe$_2$; Ph(H)Si(3-Me$_3$Si—CH$_2$-Cp)$_2$HfMe$_2$; rac/meso-(biphenyl)$_2$Si(3-Me$_3$Si—CH$_2$-Cp)$_2$HfMe$_2$; rac/meso-(F—C$_6$H$_4$)$_2$Si(3-Me$_3$Si—CH$_2$-Cp)$_2$HfMe$_2$; rac/meso-Me$_2$Ge(3-Me$_3$Si—CH$_2$-Cp)$_2$HfMe$_2$; rac-Me$_2$Ge(3-Me$_3$Si—CH$_2$-Cp)$_2$HfMe$_2$; rac/meso-Ph$_2$Ge(3-Me$_3$Si—CH$_2$-Cp)$_2$HfMe$_2$; Me$_2$Si(Me$_4$Cp)(3-Me$_3$Si—CH$_2$-Cp)HfMe$_2$; Ph$_2$Si(Me$_4$Cp)(3-Me$_3$Si—CH$_2$-Cp)HfMe$_2$; Me$_2$Ge(Me$_4$Cp)(3-Me$_3$Si—CH$_2$-Cp)HfMe$_2$; Ph$_2$Ge(Me$_4$Cp)(3-Me$_3$Si—CH$_2$-Cp)HfMe$_2$; PhMeSi(Me$_4$Cp)(3-Me$_3$Si—CH$_2$-Cp)HfMe$_2$; (CH$_2$)$_3$Si(Me$_4$Cp)(3-Me$_3$Si—CH$_2$-Cp)HfMe$_2$; (CH$_2$)$_4$Si(Me$_4$Cp)(3-Me$_3$Si—CH$_2$-Cp)HfMe$_2$; Et$_2$Si(Me$_4$Cp)(3-Me$_3$Si—CH$_2$-Cp)HfMe$_2$; rac/meso-Me$_2$Si(3-nPrCp)$_2$HfMe$_2$; rac/meso-Ph$_2$Si(3-nPrCp)$_2$HfMe$_2$; rac/meso-PhMeSi(3-nPrCp)$_2$HfMe$_2$; rac/meso-(CH$_2$)$_4$Si(3-nPrCp)$_2$HfMe$_2$; rac/meso-(CH$_2$)$_3$Si(3-nPrCp)$_2$HfMe$_2$; Me(H)Si(3-nPrCp)$_2$HfMe$_2$; Ph(H)Si(3-nPrCp)$_2$HfMe$_2$; rac/meso-(biphenyl)$_2$Si(3-nPrCp)$_2$HfMe$_2$; rac/meso-(F—C$_6$H$_4$)$_2$Si(3-nPrCp)$_2$HfMe$_2$; rac/meso-Me$_2$Ge(3-nPrCp)$_2$HfMe$_2$; rac/meso-Ph$_2$Ge(3-nPrCp)$_2$HfMe$_2$; rac/meso-Me$_2$Si(3-nBuCp)$_2$HfMe$_2$; rac/meso-Ph$_2$Si(3-nBuCp)$_2$HfMe$_2$; rac/meso-PhMeSi(3-nBuCp)$_2$HfMe$_2$; rac/meso-(CH$_2$)$_4$Si(3-nBuCp)$_2$HfMe$_2$; rac/meso-(CH$_2$)$_3$Si(3-nBuCp)$_2$HfMe$_2$; Me(H)Si(3-nBuCp)$_2$HfMe$_2$; Ph(H)Si(3-nBuCp)$_2$HfMe$_2$; rac/meso-(biphenyl)$_2$Si(3-nBuCp)$_2$HfMe$_2$; rac/meso-(F—C$_6$H$_4$)$_2$Si(3-nBuCp)$_2$HfMe$_2$; rac/meso-Me$_2$Ge(3-nBuCp)$_2$HfMe$_2$; rac/meso-Ph$_2$Ge(3-nBuCp)$_2$HfMe$_2$; Me$_2$Si(Me$_4$Cp)(3-nPrCp)HfMe$_2$; Ph$_2$Si(Me$_4$Cp)(3-nPrCp)HfMe$_2$; Me$_2$Ge(Me$_4$Cp)(3-nPrCp)HfMe$_2$; Ph$_2$Ge(Me$_4$Cp)(3-nPrCp)HfMe$_2$; PhMeSi(Me$_4$Cp)(3-nPrCp)HfMe$_2$; (CH$_2$)$_3$Si(Me$_4$Cp)(3-nPrCp)HfMe$_2$; (CH$_2$)$_4$Si(Me$_4$Cp)(3-nPrCp)HfMe$_2$; Et$_2$Si(Me$_4$Cp)(3-nPrCp)HfMe$_2$; Me$_2$Si(Me$_4$Cp)(3-nBuCp)HfMe$_2$; Ph$_2$Si(Me$_4$Cp)(3-nBuCp)HfMe$_2$; Me$_2$Ge(Me$_4$Cp)(3-nBuCp)HfMe$_2$; Ph$_2$Ge(Me$_4$Cp)(3-nBuCp)HfMe$_2$; PhMeSi(Me$_4$Cp)(3-nBuCp)HfMe$_2$; (CH$_2$)$_3$Si(Me$_4$Cp)(3-nBuCp)HfMe$_2$; (CH$_2$)$_4$Si(Me$_4$Cp)(3-nBuCp)HfMe$_2$; Et$_2$Si(Me$_4$Cp)(3-nBuCp)HfMe$_2$; Me$_2$Si(3-CH$_2$—SiMe$_3$-Cp)$_2$HfMe$_2$; Ph$_2$Si(3-CH$_2$—SiMe$_3$-Cp)$_2$HfMe$_2$; PhMeSi(3-CH$_2$—SiMe$_3$-Cp)$_2$HfMe$_2$; SiMe$_2$(Me$_4$Cp)(3-nPrCp)HfMe$_2$; SiPh$_2$(Me4Cp)(3-nPrCp)HfMe$_2$; Me$_2$Ge(Me$_4$Cp)(3-nPrCp)HfMe$_2$; Ph$_2$Ge(Me$_4$Cp)(3-nPrCp)HfMe$_2$; PhMeSi(Me$_4$Cp)(3-nPrCp)HfMe$_2$; Et$_2$Si(Me$_4$Cp)(3-nPrCp)HfMe$_2$; SiMe$_2$(EtMe$_3$Cp)(3-nPrCp)HfMe$_2$; SiMe$_2$(Me$_4$Cp)(3-nBuCp)HfMe$_2$; SiPh$_2$(Me$_4$Cp)(3-nBuCp)HfMe$_2$; Me$_2$Ge(Me$_4$Cp)(3-nBuCp)HfMe$_2$; Ph$_2$Ge(Me$_4$Cp)(3-nBuCp)HfMe$_2$; PhMeSi(Me$_4$Cp)(3-nBuCp)HfMe$_2$; Et$_2$Si(Me$_4$Cp)(3-nBuCp)HfMe$_2$; SiMe$_2$(EtMe$_3$Cp)(3-nBuCp)HfMe$_2$; SiMe$_2$(Me$_4$Cp)(3-CH$_2$—SiMe$_3$-Cp)HfMe$_2$; SiPh$_2$(Me$_4$Cp)(3-CH$_2$—SiMe$_3$-Cp)HfMe$_2$; Me$_2$Ge(Me$_4$Cp)(3-CH$_2$—SiMe$_3$-Cp)HfMe$_2$; Ph$_2$Ge(Me$_4$Cp)(3-CH$_2$—SiMe$_3$-Cp)HfMe$_2$; PhMeSi(Me$_4$Cp)(3-CH$_2$—SiMe$_3$-Cp)HfMe$_2$; Et$_2$Si(Me$_4$Cp)(3-CH$_2$—SiMe$_3$-Cp)HfMe$_2$; SiMe$_2$(EtMe$_3$Cp)(3-CH$_2$—SiMe$_3$-Cp)HfMe$_2$; SiMe$_2$(Me$_4$Cp)(3-CH$_2$—SiPhMe$_2$-Cp)HfMe$_2$; SiPh$_2$(Me$_4$Cp)(3-CH$_2$—SiPhMe$_2$-Cp)HfMe$_2$; Me$_2$Ge(Me$_4$Cp)(3-CH$_2$—SiPhMe$_2$)HfMe$_2$; Ph$_2$Ge(Me$_4$Cp)(3-CH$_2$—SiPhMe$_2$)HfMe$_2$; PhMeSi(Me$_4$Cp)(3-CH$_2$—SiPhMe$_2$-Cp)HfMe$_2$; Et$_2$Si(Me$_4$Cp)(3-CH$_2$—SiPhMe$_2$-Cp)HfMe$_2$; SiMe$_2$(EtMe$_3$Cp)(3-CH$_2$—SiPh$_3$-Cp)HfMe$_2$; SiMe$_2$(Me$_4$Cp)(3-CH$_2$—SiPh$_3$-Cp)HfMe$_2$; SiPh$_2$(Me$_4$Cp)(3-CH$_2$—SiPh$_3$-Cp)HfMe$_2$; Me$_2$Ge(Me$_4$Cp)(3-CH$_2$—SiPh$_3$)HfMe$_2$; Ph$_2$Ge(Me$_4$Cp)(3-CH$_2$—SiPh$_3$)HfMe$_2$; PhMeSi(Me$_4$Cp)(3-CH$_2$—SiPh$_3$-Cp)HfMe$_2$; Et$_2$Si(Me$_4$Cp)(3-CH$_2$—SiPh$_3$-Cp)HfMe$_2$; SiMe$_2$(EtMe$_3$Cp)(3-CH$_2$—SiPh$_3$-Cp)HfMe$_2$; SiMe$_2$(2-Me,3-n-Pr-Ind)$_2$HfMe$_2$; SiPh$_2$(2-Me,3-n-Pr-Ind)$_2$HfMe$_2$; GeMe$_2$(2-Me,3-n-Pr-Ind)$_2$HfMe$_2$; GePh$_2$(2-Me,3-n-Pr-Ind)$_2$HfMe$_2$; SiPhMe(2-Me,3-n-Pr-Ind)$_2$HfMe$_2$; Et$_2$Si(2-Me,3-n-Pr-Ind)$_2$HfMe$_2$; SiMe$_2$(2-Me,3-n-Bu-Ind)$_2$HfMe$_2$; SiPh$_2$(2-Me,3-n-Bu-Ind)$_2$HfMe$_2$; GeMe$_2$(2-Me,3-n-Bu-Ind)$_2$HfMe$_2$; GePh$_2$(2-Me,3-n-Bu-Ind)$_2$HfMe$_2$; SiPhMe(2-Me,3-n-Bu-Ind)$_2$HfMe$_2$; Et$_2$Si(2-Me,3-n-Bu-Ind)$_2$HfMe$_2$; SiMe$_2$(2-Me,3-CH$_2$—SiMe$_3$-Ind)$_2$HfMe$_2$; SiPh$_2$(2-Me,3-CH$_2$—SiMe$_3$-Ind)$_2$HfMe$_2$; GeMe$_2$(2-Me,3-CH$_2$—SiMe$_3$-Ind)$_2$HfMe$_2$; GePh$_2$(2-Me,3-CH$_2$—SiMe$_3$-Ind)$_2$HfMe$_2$; SiPhMe(2-Me,3-CH$_2$—SiMe$_3$-Ind)$_2$HfMe$_2$; Et$_2$Si(2-Me,3-CH$_2$—SiMe$_3$-Ind)$_2$HfMe$_2$; SiMe$_2$(2-Me,3-CH$_2$—SiPhMe$_2$-Ind)$_2$HfMe$_2$; SiPh$_2$(2-Me,3-CH$_2$—

SiPhMe$_2$-Ind)$_2$HfMe$_2$; GeMe$_2$(2-Me,3-CH$_2$—SiPhMe$_2$-Ind)$_2$HfMe$_2$; GePh$_2$(2-Me,3-CH$_2$—SiPhMe$_2$-Ind)$_2$HfMe$_2$; SiPhMe(2-Me,3-CH$_2$—SiPhMe$_2$-Ind)$_2$HfMe$_2$; Et$_2$Si(2-Me,3-CH$_2$—SiPhMe$_2$-Ind)$_2$HfMe$_2$; SiMe$_2$(2-Me,3-CH$_2$—SiPh$_3$-Ind)$_2$HfMe$_2$; SiPh$_2$(2-Me,3-CH$_2$—SiPh$_3$-Ind)$_2$HfMe$_2$; GeMe$_2$(2-Me,3-CH$_2$—SiPh$_3$-Ind)$_2$HfMe$_2$; GePh$_2$(2-Me,3-CH$_2$—SiPh$_3$-Ind)$_2$HfMe$_2$; SiPhMe(2-Me,3-CH$_2$—SiPh$_3$-Ind)$_2$HfMe$_2$; Et$_2$Si(2-Me,3-CH$_2$—SiPh$_3$-Ind)$_2$HfMe$_2$, and the alkyl or halide versions thereof, such as where the Me$_2$ is substituted with Et$_2$, Cl$_2$, Br$_2$, I$_2$, or Ph$_2$.

Iron Compounds

The second catalyst compound of catalyst systems of the present disclosure is an iron complex represented by formula (B):

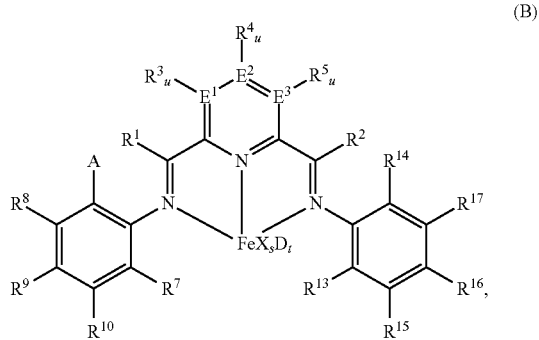

(B)

wherein:

A is chlorine, bromine, iodine, —CF$_3$ or —OR$^{11}$;

each of R$^1$ and R$^2$ is independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, or five-, six- or seven-membered heterocyclyl comprising at least one atom selected from the group consisting of N, P, O and S;

wherein each of R$^1$ and R$^2$ is optionally substituted by halogen, —NR$^{11}$$_2$, —OR$^{11}$ or —SiR$^{12}$$_3$;

wherein R$^1$ optionally bonds with R$^3$, and R$^2$ optionally bonds with R$^5$, in each case to independently form a five-, six- or seven-membered ring; R$^7$ is a C$_1$-C$_{20}$ alkyl;

each of R$^3$$_u$, R$^4$$_u$, R$^5$$_u$, R$^8$, R$^9$, R$^{10}$, R$^{15}$, R$^{16}$, and R$^{17}$ is independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, —NR$^{11}$$_2$, —OR$^{11}$, halogen, —SiR$^{12}$$_3$ or five-, six- or seven-membered heterocyclyl comprising at least one atom selected from the group consisting of N, P, O, and S;

wherein R$^3$$_u$, R$^4$$_u$, R$^5$$_u$, R$^7$, R$^8$, R$^9$, R$^{10}$, R$^{15}$, R$^{16}$, and R$^{17}$ are optionally substituted by halogen, —NR$^{11}$$_2$, —OR$^{11}$ or —SiR$^{12}$$_3$;

wherein R$^3$ optionally bonds with R$^4$, R$^4$ optionally bonds with R$^5$, R$^7$ optionally bonds with R$^{10}$, R$^{10}$ optionally bonds with R$^9$, R$^9$ optionally bonds with R$^8$, R$^{17}$ optionally bonds with R$^{16}$, and R$^{16}$ optionally bonds with R$^{15}$, in each case to independently form a five-, six- or seven-membered carbocyclic or heterocyclic ring, the heterocyclic ring comprising at least one atom from the group consisting of N, P, O and S;

R$^{13}$ is C$_1$-C$_{20}$-alkyl bonded with the aryl ring via a primary or secondary carbon atom;

R$^{14}$ is chlorine, bromine, iodine, —CF$_3$ or —OR$^{11}$, or C$_1$-C$_{20}$-alkyl bonded with the aryl ring; each R$^{11}$ is independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, or —SiR$^{12}$$_3$, wherein R$^{11}$ is optionally substituted by halogen, or two R$^{11}$ radicals optionally bond to form a five- or six-membered ring;

each R$^{12}$ is independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, or two R$^{12}$ radicals optionally bond to form a five- or six-membered ring;

each of E$^1$, E$^2$, and E$^3$ is independently carbon, nitrogen or phosphorus;

each u is independently 0 if E$^1$, E$^2$, and/or E$^3$ is nitrogen or phosphorus and is 1 if E$^1$, E$^2$, and/or E$^3$ is carbon;

each X is independently fluorine, chlorine, bromine, iodine, hydrogen, C$_1$-C$_{20}$-alkyl, C$_2$-C$_{10}$-alkenyl, C$_6$-C$_{20}$-aryl, arylalkyl where alkyl has from 1 to 10 carbon atoms and aryl has from 6 to 20 carbon atoms, —NR$^{18}$$_2$, —OR$^{18}$, —SR$^{18}$, —SO$_3$R$^{18}$, —OC(O)R$^{18}$, —CN, —SCN, β-diketonate, —CO, —BF$_4$$^-$, —PF$_6$$^-$ or bulky non-coordinating anions, and the radicals X can be bonded with one another;

each R$^{18}$ is independently hydrogen, C$_1$-C$_{20}$-alkyl, C$_2$-C$_{20}$-alkenyl, C$_6$-C$_{20}$-aryl, arylalkyl where alkyl has from 1 to 10 carbon atoms and aryl has from 6 to 20 carbon atoms, or —SiR$^{19}$$_3$, wherein R$^{18}$ can be substituted by halogen or nitrogen- or oxygen-containing groups and two R$^{18}$ radicals optionally bond to form a five- or six-membered ring;

each R$^{19}$ is independently hydrogen, C$_1$-C$_{20}$-alkyl, C$_2$-C$_{20}$-alkenyl, C$_6$-C$_{20}$-aryl or arylalkyl where alkyl has from 1 to 10 carbon atoms and aryl has from 6 to 20 carbon atoms, wherein R$^{19}$ can be substituted by halogen or nitrogen- or oxygen-containing groups or two R$^{19}$ radicals optionally bond to form a five- or six-membered ring;

s is 1, 2, or 3;

D is a neutral donor;

t is 0 to 2, such as 0, 1, or 2;

u is 1 or 0 depending on whether the E group is N, P, or C. For example, if E$^1$ is carbon, then u for R$^3$ is 1; if E$^2$ is nitrogen, then u for R$^4$ is 0; if E$^3$ is carbon, then u for R$^5$ is 1; and if E$^1$, E$^2$, and E$^3$ are carbon, all u are 1.

In at least one embodiment, each of A and R$^{14}$ is chlorine; each of R$^1$ and R$^2$ is methyl; each of R$^3$-R$^5$ is hydrogen; each of R$^7$ and R$^9$ is methyl; each of R$^8$ and R$^{10}$, and R$^{15}$-R$^{17}$ is independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, —NR$^{11}$$_2$, —OR$^{11}$, halogen, —SiR$^{12}$$_3$ or five-, six- or seven-membered heterocyclyl comprising at least one atom selected from the group consisting of N, P, O and S; R$^7$-R$^{10}$ and R$^{15}$-R$^{17}$ are optionally substituted by halogen, —NR$^{11}$$_2$, —OR$^{11}$ or —SiR$^{12}$$_3$; and wherein R$^7$ optionally bonds with R$^{10}$, R$^{10}$ optionally bonds with R$^9$, R$^9$ optionally bonds with R$^8$, R$^{17}$ optionally bonds with R$^{16}$, and R$^{16}$ optionally bonds with R$^{15}$, in each case to independently form a five-, six- or seven-membered carbocyclic or heterocyclic ring, the heterocyclic ring comprising at least one atom selected from the group consisting of N, P, O and S; R$^{13}$ is independently a C$_1$-C$_3$-alkyl bonded with the aryl ring via a primary or secondary carbon atom; each R$^{11}$ is independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, or —SiR$^{12}$$_3$, wherein R$^{11}$ is optionally substituted by halogen, or two R$^{11}$ radicals optionally bond to form a five- or six-membered ring; each R$^{12}$ is independently hydrogen, C$_1$-C$_{22}$-alkyl, C$_2$-C$_{22}$-alkenyl, C$_6$-C$_{22}$-aryl or arylalkyl where alkyl has from 1 to 10 carbon atoms and aryl has from 6 to 20 carbon atoms, or two $R^{12}$ radicals optionally bond to form a five- or six-membered ring; each of $E^1$, $E^2$, and $E^3$ is carbon; and each u is 1.

In at least one embodiment, D is a neutral donor such as a neutral Lewis base or Lewis acid, such as, for example, amines, alcohols, ethers, ketones, aldehydes, esters, sulfides or phosphines, which can be bonded with the iron center or can still be contained in the complex as residual solvent from the preparation of the iron complexes.

Catalyst compounds represented by formula (B) that are particularly useful in at least one embodiment of the present disclosure include one or more of: bis(2,6-[1-(2,6-dimethylphenylimino)ethyl])pyridineiron dichloride, bis(2,6-[1-(2,4,6-trimethylphenylimino)ethyl)])pyridineiron dichloride, bis(2,6-[1-(2,6-dimethylphenylimino)ethyl]-ethyl])pyridineiron dichloride, 2-[1-(2,4,6-trimethylphenylimino)ethyl]-6-[1-(2,4-dichloro-6-methylphenylimino)ethyl]pyridineiron dichloride, 2-[1-(2,6-dimethylphenylimino)ethyl]-6-[1-(2-chloro-6-methylphenylimino)ethyl]pyridineiron dichloride, 2-[1-(2,4,6-trimethylphenylimino)ethyl]-6-[1-(2-chloro-6-methylphenylimino)ethyl]pyridineiron dichloride, 2-[1-(2,6-diisopropylphenylimino)ethyl]-6-[1-(2-chloro-6-methylphenylimino)ethyl]pyridineiron dichloride, 2-[1-(2,6-dimethylphenylimino)ethyl]-6-[1-(2-bromo-4,6-dimethylphenylimino)ethyl]pyridineiron dichloride, 2-[1-(2,4,6-trimethylphenylimino)ethyl]-6-[1-(2-bromo-4,6-dimethylphenylimino)ethyl]pyridineiron dichloride, 2-[1-(2,6-dimethylphenylimino)ethyl]-6-[1-(2-bromo-6-methylphenylimino)ethyl]pyridineiron dichloride, 2-[1-(2,4,6-trimethylphenylimino)ethyl]-6-[1-(2-bromo-6-methylphenylimino)ethyl]pyridineiron dichloride and 2-[1-(2,6-diisopropylphenylimino)ethyl]-6-[1-(2-bromo-6-methylphenylimino)ethyl]pyridineiron dichloride or the dibromides or tribromides thereof (e.g., where dichloride in the list above is replaced with dibromide or tribromide).

Support Material

In embodiments of the present disclosure, the catalyst systems comprise a support material. For example, the support material is a porous support material, for example, talc, and inorganic oxides. Other support materials include zeolites, clays, organoclays, or any other organic or inorganic support material, or mixtures thereof. As used herein, "support" and "support material" are used interchangeably.

For example, the support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Exemplary support materials include $Al_2O_3$, $ZrO_2$, $SiO_2$, and combinations thereof, such as $SiO_2$, $Al_2O_3$, or $SiO_2/Al_2O_3$.

The support material, such as an inorganic oxide, can have a surface area in the range of from about 10 m$^2$/g to about 700 m$^2$/g, pore volume in the range of from about 0.1 cc/g to about 4.0 cc/g, and average particle size in the range of from about 5 m to about 500 μm. For example, the surface area of the support material is in the range of from about 50 m$^2$/g to about 500 m$^2$/g, pore volume of from about 0.5 cc/g to about 3.5 cc/g, and average particle size of from about 10 m to about 200 m. For example, the surface area of the support material is in the range of from about 100 m$^2$/g to about 400 m$^2$/g, pore volume from about 0.8 cc/g to about 3.0 cc/g, and average particle size is from about 5 m to about 100 m. The average pore size of the support material useful in at least one embodiment of the present disclosure is in the range of from 10 to 1,000 Å, such as 50 to about 500 Å, and such as 75 to about 350 Å. In some embodiments, the support material is a high surface area, amorphous silica (surface area ≥300 m$^2$/gm, pore volume ≥1.65 cm$^3$/gm), and is marketed under the trade names of DAVISON 952 or DAVISON 955 by the Davison Chemical Division of W. R. Grace and Company, are particularly useful. In other embodiments, DAVIDSON 948 is used.

In at least one embodiment of the present disclosure, the support material may be dry, that is, free of absorbed water. Drying of the support material can be achieved by heating or calcining at about 100° C. to about 1000° C., such as at least about 600° C. When the support material is silica, it can be heated to at least 200° C., such as about 200° C. to about 850° C., and such as at about 600° C.; and for a time of about 1 minute to about 100 hours, from about 12 hours to about 72 hours, or from about 24 hours to about 60 hours. The calcined support material, for example, has at least some reactive hydroxyl (OH) groups.

In a particularly useful embodiment, the support material is fluorided. Fluoriding agent containing compounds may be any compound containing a fluorine atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds can be solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is in the range of from 0.1 to 25 wt %, alternatively from 0.19 to 19 wt %, alternatively from 0.6 to 3.5 wt %, based upon the weight of the support.

The above two metal catalyst components described herein are generally deposited on the support material at a loading level of 10-100 micromoles of metal per gram of solid support; alternatively 20-80 micromoles of metal per gram of solid support; or 40-60 micromoles of metal per gram of support. But greater or lesser values may be used provided that the total amount of solid complex does not exceed the support's pore volume.

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, and the like, or any combination thereof, at least one embodiment. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Non-limiting examples of cations suitable for use in the present disclosure in the salt of the electron-withdrawing anion include ammonium, trialkyl ammonium, tetraalkyl ammonium, tetraalkyl phosphonium, H+, [H(OEt$_2$)$_2$]+, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, such as a salt or an acid of an electron-withdrawing anion, can include, but is not limited to, gelling, co-gelling, impregnation of one compound onto another, and the like, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Activators

The supported catalyst systems may be formed by combining the above two metal catalyst components with activators in any suitable manner including by supporting them for use in slurry or gas phase polymerization. Activators are defined to be any compound which can activate any one of the catalyst compounds described above by converting the neutral metal catalyst compound to a catalytically active metal catalyst compound cation. Non-limiting activators, for example, include alumoxanes, aluminum alkyls, ionizing activators, which may be neutral or ionic, and conventional-type cocatalysts. Exemplary activators include alumoxane compounds, modified alumoxane compounds, and ionizing anion precursor compounds that abstract a reactive, σ-bound, metal ligand making the metal catalyst compound cationic and providing a charge-balancing non-coordinating or weakly coordinating anion.

Alumoxane Activators

Alumoxane activators are utilized as activators in the catalyst systems described herein. Alumoxanes are generally oligomeric compounds containing —Al(R$^1$)—O— subunits, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be desired to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator such as at up to a 5000-fold molar excess Al/M over the catalyst compound (per metal catalytic site). The minimum activator-to-catalyst-compound is a 1:1 molar ratio. Alternate ranges include from 1:1 to 500:1, alternatively from 1:1 to 200:1, alternatively from 1:1 to 100:1, or alternatively from 1:1 to 50:1.

In an alternate embodiment, little or no alumoxane is used in the polymerization processes described herein. For example, alumoxane is present at zero mol %, alternatively the alumoxane is present at a molar ratio of aluminum to catalyst compound transition metal less than 500:1, such as less than 300:1, such as less than 100:1, such as less than 1:1.

Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions can include those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present disclosure to use neutral or ionic activators alone or in combination with alumoxane or modified alumoxane activators.

For descriptions of useful activators please see U.S. Pat. Nos. 8,658,556 and 6,211,105.

Exemplary activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4^-$], 1-(4-(tris(pentafluorophenyl)borate)-2,3,5,6-tetrafluorophenyl)pyrrolidinium; sodium tetrakis (pentafluorophenyl)borate, potassium tetrakis (pentafluorophenyl)borate, 4-(tris(pentafluorophenyl) borate)-2,3,5,6-tetrafluoropyridinium, sodium tetrakis (perfluorophenyl)aluminate, and N,N-dimethylanilinium tetrakis(perfluorophenyl)aluminate.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis (pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate ranges include from 0.1:1 to 100:1, alternatively from 0.5:1 to 200:1, alternatively from 1:1 to 500:1 alternatively from 1:1 to 1000:1. A particularly useful range is from 0.5:1 to 10:1, such as 1:1 to 5:1.

Optional Scavengers or Co-Activators

In addition to the activator compounds, scavengers, chain transfer agents or co-activators may be used. Aluminum alkyl or organoaluminum compounds which may be utilized as co-activators include, for example, trimethylaluminum, triethylaluminum, triisobutylaluminum, tri-n-hexylaluminum, tri-n-octylaluminum, diethyl zinc, tri-n-butylaluminum, diisobutylaluminum hydride, or combinations thereof.

In some embodiments, the catalyst systems will additionally comprise one or more scavenging compounds. Here, the term "scavenger" means a compound that removes polar impurities from the reaction environment. These impurities adversely affect catalyst activity and stability. For example, the scavenging compound will be an organometallic compound such as the Group-13 organometallic compounds of U.S. Pat. Nos. 5,153,157; 5,241,025; and PCT Publication Nos. WO 91/09882; WO 94/03506; WO 93/14132; and WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or C$_6$-C$_{20}$ linear hydrocarbyl substituents connected to the metal or metalloid center usually minimize adverse interaction with the active catalyst. Examples include triethyl aluminum, such as bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, [Me$_2$HNPh]+[B(pfp)$_4$]$^-$ or B(pfp)$_3$ (perfluorophenyl=pfp=C$_6$F$_5$).

Exemplary aluminum scavengers include those where there is oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In one aspect, aluminum containing scavengers can be represented by the formula ((R$_z$—Al—)$_y$O—)$_x$, wherein z is 1-2, y is 1-2, x is 1-100, and R is a C$_1$-C$_{12}$ hydrocarbyl group. In another aspect, the scavenger has an oxygen to aluminum (O/Al) molar ratio of from about 0.25 to about 1.5, more particularly from about 0.5 to about 1.

Preparation of Mixed Catalyst Systems

The above two metal catalysts can be combined to form a mixed catalyst system.

The two or more metal catalyst compounds can be added together in a desired ratio when combined, contacted with an activator, or contacted with a support material or a supported activator. The metal catalyst compounds may be added to the mixture sequentially or at the same time. The ratio of catalyst (A):(B) can vary depending on the balance of processability versus physical characteristics of the desired polymer. For example, the ratio (A):(B) can range from 1:10 to 10:1, such as 5:1 to 1:5 or 1:1.

Other procedures are possible, such as addition of a first metal catalyst compound to a slurry including a support or a supported activator mixture for a specified reaction time, followed by the addition of the second metal catalyst compound solution, mixed for another specified time, after which the mixture may be recovered for use in a polymerization reactor, such as by spray drying. Lastly, another additive, such as 1-hexene in about 10 vol % can be present in the mixture prior to the addition of the first metal catalyst compound.

The first metal catalyst compound may be supported via contact with a support material for a reaction time. The resulting supported catalyst composition may then be mixed with mineral oil (or a paraffin wax) to form a slurry, which may or may not include an activator. The slurry may then be admixed with a second metal catalyst compound prior to introduction of the resulting mixed catalyst system to a polymerization reactor. The second metal catalyst compounds may be admixed at any point prior to introduction to the reactor, such as in a polymerization feed vessel or in-line in a catalyst delivery system.

The mixed catalyst system may be formed by combining a first metal catalyst compound (for example a metal catalyst compound useful for producing a first polymer attribute, such as a high molecular weight polymer fraction or high comonomer content) with a support and activator, desirably in a first diluent such as an alkane or toluene, to produce a supported, activated catalyst compound. The supported activated catalyst compound, either isolated from the first diluent or not, is then combined in one embodiment with a high viscosity diluent such as mineral or silicon oil, or an alkane diluent comprising from 5 to 99 wt % mineral or silicon oil to form a slurry of the supported metal catalyst compound, followed by, or simultaneous to combining with a second metal catalyst compound (for example, a metal catalyst compound useful for producing a second polymer attribute, such as a low molecular weight polymer fraction or low comonomer content), either in a diluent or as the dry solid compound, to form a supported activated mixed catalyst system ("mixed catalyst system"). The mixed catalyst system thus produced may be a supported and activated first metal catalyst compound in a slurry, the slurry comprising mineral or silicon oil, with a second metal catalyst compound that is not supported and not combined with additional activator, where the second metal catalyst compound may or may not be partially or completely soluble in the slurry. In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and can have a molecular weight of at least 300 amu to 500 amu or more, and a viscosity at 40° C. of from 40 to 300 cSt or greater, or from 50 to 200 cSt in a particular embodiment. The term "mineral oil" includes synthetic oils or liquid polymers, polybutenes, refined naphthenic hydrocarbons, and refined paraffins, such as disclosed in BLUE BOOK 2001, MATERIALS, COMPOUNDING INGREDIENTS, MACHINERY AND SERVICES FOR RUBBER 189 247 (J. H. Lippincott, D. R. Smith, K. Kish & B. Gordon eds. Lippincott & Peto Inc. 2001). Exemplary mineral and silicon oils are those that exclude moieties that are reactive with metallocene catalysts, examples of which include hydroxyl and carboxyl groups.

The diluent may comprise a blend of a mineral, silicon oil, and/or and a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the diluent is a blend comprising mineral oil, the diluent may comprise from 5 to 99 wt % mineral oil. In some embodiments, the diluent may consist essentially of mineral oil.

In one embodiment, the first metal catalyst compound is combined with an activator and a first diluent to form a catalyst slurry that is then combined with a support material. Until such contact is made, the support particles are not previously activated. The first metal catalyst compound can be in any desirable form such as a dry powder, suspension in a diluent, solution in a diluent, liquid, etc. The catalyst slurry and support particles are then mixed thoroughly, in one embodiment at an elevated temperature, so that both the first metal catalyst compound and the activator are deposited on the support particles to form a support slurry.

After the first metal catalyst compound and activator are deposited on the support, a second metal catalyst compound may then be combined with the supported first metal catalyst compound, wherein the second is combined with a diluent comprising mineral or silicon oil by any suitable means either before, simultaneous to, or after contacting the second metal catalyst compound with the supported first metal catalyst compound. In one embodiment, the first metal catalyst compound is isolated form the first diluent to a dry state before combining with the second metal catalyst compound. For example, the second metal catalyst compound is not activated, that is, not combined with any activator, before being combined with the supported first metal catalyst compound. The resulting solids slurry (including both the supported first and second metal catalyst compounds) is then mixed thoroughly at an elevated temperature.

A wide range of mixing temperatures may be used at various stages of making the mixed catalyst system. For example, in a specific embodiment, when the first metal catalyst compound and at least one activator, such as methylalumoxane, are combined with a first diluent to form a mixture, the mixture is heated to a first temperature of from 25° C. to 150° C., such as from 50° C. to 125° C., such as from 75° C. to 100° C., such as from 80° C. to 100° C. and stirred for a period of time from 30 seconds to 12 hours, such as from 1 minute to 6 hours, such as from 10 minutes to 4 hours, and such as from 30 minutes to 3 hours.

Next, that mixture is combined with a support material to provide a first support slurry. The support material can be heated, or dehydrated if desired, prior to combining. In one or more embodiments, the first support slurry is mixed at a temperature greater than 50° C., such as greater than 70° C., such as greater than 80° C. and such as greater than 85° C., for a period of time from 30 seconds to 12 hours, such as from 1 minute to 6 hours, such as from 10 minutes to 4 hours, and such as from 30 minutes to 3 hours. For example, the support slurry is mixed for a time sufficient to provide a collection of activated support particles that have the first metal catalyst compound deposited thereto. The first diluent can then be removed from the first support slurry to provide a dried supported first catalyst compound. For example, the first diluent can be removed under vacuum or by nitrogen purge.

Next, the second metal catalyst compound is combined with the activated first metal catalyst compound in the presence of a diluent comprising mineral or silicon oil in one embodiment. For example, the second metal catalyst compound is added in a molar ratio to the first metal catalyst compound in the range from 1:1 to 3:1. For example, the molar ratio is approximately 1:1. The resultant slurry (or first support slurry) is heated to a first temperature from 25° C. to 150° C., such as from 50° C. to 125° C., such as from 75° C. to 100° C., such as from 80° C. to 100° C. and stirred for a period of time from 30 seconds to 12 hours, such as from 1 minute to 6 hours, such as from 10 minutes to 4 hours, and such as from 30 minutes to 3 hours.

The first diluent is an aromatic or alkane, such as hydrocarbon diluent having a boiling point of less than 200° C. such as toluene, xylene, hexane, etc., may be removed from the supported first metal catalyst compound under vacuum or by nitrogen purge to provide a supported mixed catalyst system. Even after addition of the oil and/or the second (or other) catalyst compound, it may be desirable to treat the slurry to further remove any remaining solvents such as toluene. This can be accomplished by an $N_2$ purge or vacuum, for example. Depending upon the level of mineral oil added, the resultant mixed catalyst system may still be a slurry or may be a free flowing powder that comprises an amount of mineral oil. Thus, the mixed catalyst system, while a slurry of solids in mineral oil in one embodiment, may take any physical form such as a free flowing solid. For example, the mixed catalyst system may range from 1 to 99 wt % solids content by weight of the mixed catalyst system (mineral oil, support, all catalyst compounds and activator(s)) in one embodiment. The metallocene compound may be the first or second compound, such as the second compound.

Polymerization Processes

In embodiments herein, the present disclosure provides polymerization processes where monomer (such as ethylene), and, optionally, comonomer (such as hexene), are contacted with a supported catalyst system comprising a catalyst compound represented by formula (A), a catalyst compound represented by formula (B), an activator, and a support material as described above.

Monomers can include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomers comprise ethylene and, optional, comonomers comprising one or more $C_3$ to $C_{40}$ olefins, such as $C_4$ to $C_{20}$ olefins, or such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Exemplary $C_3$ to $C_{40}$ comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbomadiene, and their respective homologs and derivatives.

In at least one embodiment one or more dienes are present in the polymer produced herein at up to 10 wt %, such as at 0.00001 to 1.0 wt %, such as 0.002 to 0.5 wt %, even such as 0.003 to 0.2 wt %, based upon the total weight of the composition. In some embodiments 500 ppm or less of diene is added to the polymerization, such as 400 ppm or less, such as or 300 ppm or less. In other embodiments, at least 50 ppm of diene is added to the polymerization, or 100 ppm or more, or 150 ppm or more.

Diolefin monomers include any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). The diolefin monomers can be selected from alpha, omega-diene monomers (i.e., di-vinyl monomers). For example, the diolefin monomers are linear di-vinyl monomers, such as those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, such as dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Exemplary cyclic dienes include cyclopentadiene, vinylnorbornene, norbornadiene, ethylidene norbornene, divinylbenzene, dicyclopentadiene or higher ring containing diolefins with or without substituents at various ring positions.

In at least one embodiment, a process provides polymerization of ethylene and at least one comonomer having from 3 to 8 carbon atoms, such as 4 to 8 carbon atoms. Particularly, the comonomers are propylene, 1-butene, 4-methyl-1-pentene, 3-methyl-1-pentene, 1-hexene and 1-octene, such as 1-hexene, 1-butene and 1-octene.

In at least one embodiment, a process provides polymerization of one or more monomers selected from the group consisting of propylene, 1-butene, 1-pentene, 3-methyl-1-pentene, 4-methyl-1-pentene, 1-hexene, 1-octene, 1-decene, and combinations thereof.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Gas phase polymerization processes and slurry processes can be used. (A homogeneous polymerization process can be a process where at least 90 wt % of the product is soluble in the reaction media.) A bulk homogeneous process can be used. (A bulk process can be a process where monomer concentration in all feeds to the reactor is 70 volume % or more.) Alternatively, no solvent or diluent is present or added in the reaction medium (except for the small amounts used as the carrier for the catalyst system or other additives, or amounts typically found with the monomer; e.g., propane in propylene).

In another embodiment, the process is a slurry process. As used herein, the term "slurry polymerization process" can mean a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorided $C_{4-10}$ alkanes, chlorobenzene, and aromatic and alkylsubstituted aromatic compounds, such as benzene, toluene, mesitylene, and xylene. Suitable solvents also include liquid olefins, which may act as monomers or comonomers, including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, or such as 20 vol % or less, based on the total volume of the feedstream. In at least one embodiment, the polymerization is run in a bulk process.

Exemplary polymerizations can be run at any temperature and/or pressure suitable to obtain the desired ethylene polymers and as described above. Typical pressures include pressures in the range of from about 0.35 MPa to about 10 MPa, such as from about 0.45 MPa to about 6 MPa, or such as from about 0.5 MPa to about 4 MPa in some embodiments.

In some embodiments, hydrogen is present in the polymerization reactor at a partial pressure of 0.001 to 50 psig (0.007 to 345 kPa), such as from 0.01 to 25 psig (0.07 to 172 kPa), more such as 0.1 to 10 psig (0.7 to 70 kPa).

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as a branched alkane. The medium employed should be liquid under the conditions of polymerization and relatively inert. When a propane medium is used, the process must be operated above the reaction diluent critical temperature and pressure. For example, a hexane or an isobutane medium is employed.

Polyolefin Products

The present disclosure further provides compositions of matter produced by the methods described herein.

In at least one embodiment, a process described herein produces ethylene homopolymers or ethylene copolymers, such as ethylene-alpha-olefin (such as $C_3$ to $C_{20}$) copolymers (such as ethylene-butene copolymers, ethylene-hexene and/or ethylene-octene copolymers).

Likewise, processes of the present disclosure can produce ethylene copolymers. In at least one embodiment, the copolymers produced herein have from 0 to 25 mol % (alternatively from 0.5 to 20 mol %, alternatively from 1 to 15 mol %, such as from 3 to 10 mol %, such as from 6 to 10 mol %) of one or more $C_3$ to $C_{20}$ olefin comonomer, such as a $C_3$-$C_{20}$ alpha-olefin, (such as $C_3$ to $C_{12}$ alpha-olefin, such as propylene, butene, hexene, octene, decene, dodecene, such as propylene, butene, hexene, octene).

In at least one embodiment, the monomer is ethylene and the comonomer is hexene, such as from 1 to 15 mol % hexene, alternatively 1 to 10 mol %.

In at least one embodiment, a method of the present disclosure provides an in-situ ethylene polymer composition having: 1) at least 50 mol % ethylene; and 2) a density of 0.91 g/cc or more, such as 0.935 g/cc or more (ASTM 1505). For example, the copolymer has higher comonomer (e.g., hexene) content in the higher molecular weight component of the resin as compared to the lower molecular weight component, such as at least 10% higher, such as at least 20% higher, such as at least 30% higher as determined by GPC-4D. The dividing line between higher and lower molecular weight is the midpoint between the Mw's of two polymers each made using the same polymerization conditions as the product made using the two catalysts on a support, except that the first polymer is made without the catalyst represented by formula (A) and the second polymer is made without the catalyst represented by formula (B). In the event such a midpoint cannot be determined because one or both single catalysts will not produce polymer at the required conditions then an Mw of 150,000 g/mol shall be used.

The copolymer produced herein typically has a composition distribution breadth $T_{75}$-$T_{25}$, as measured by TREF that is greater than 20° C., such as greater than 30° C., such as greater than 40° C. The $T_{75}$-$T_{25}$ value represents the homogeneity of the composition distribution as determined by temperature rising elution fractionation. A TREF curve is produced as described below. Then the temperature at which 75% of the polymer is eluted is subtracted from the temperature at which 25% of the polymer is eluted, as determined by the integration of the area under the TREF curve. The $T_{75}$-$T_{25}$ value represents the difference. The closer these temperatures comes together, the narrower the composition distribution.

Typically, the polymers produced herein have molecular weight of 5,000 to 1,000,000 g/mol (such as 25,000 to 750,000 g/mol, such as 50,000 to 500,000 g/mol), and/or an Mw/Mn of greater than 1 to 40 (alternatively 1.2 to 20, alternatively 1.3 to 10, alternatively 1.4 to 5, 1.5 to 4, alternatively 1.5 to 3) as determined by GPC-4D. Polymers produced herein typically have an Mz/Mw from about 1 to about 10, such as from about 2 to about 6, such as from about 3 to about 5. Furthermore, the ratio of other average molecular weight ratios can also been calculated to highlight how the distribution is affected. For instance, a trace amount of very high MW species in a polymer product can preferentially raise Mz more than Mw and, therefore, result in a significantly higher ratio of Mz/Mw. Such difference in the effect on molecular weight distribution has been discovered to have profound effects on film toughness, such as tear property, through molecular orientation during the fabrication process.

In at least one embodiment, the polymer produced herein has a unimodal or multimodal molecular weight distribution as determined by Gel Permeation Chromatography (GPC). By "unimodal" is meant that the GPC trace has one peak or two inflection points. By "multimodal" is meant that the GPC trace has at least two peaks or more than 2 inflection points. An inflection point is that point where the second derivative of the curve changes in sign (e.g., from negative to positive or vice versa).

In at least one embodiment, the polymer produced herein has a bimodal molecular weight distribution as determined by Gel Permeation Chromatography (GPC). By "bimodal" is meant that the GPC trace has two peaks or at least 4 inflection points.

In another embodiment, the polymer produced herein has two peaks in the TREF measurement (see below). Two peaks in the TREF measurement as used in this specification and the appended claims means the presence of two distinct normalized IR response peaks in a graph of normalized IR response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. For example, the two distinct peaks are at least 3° C. apart, more such as at least 4° C. apart, such as at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bi-modal composition distribution (CD). An alternate method for TREF measurement can be used if the method below does not show two peaks, i.e., see B. Monrabal, "Crystallization Analysis Fractionation: A New Technique for the Analysis of Branching Distribution in Polyolefins," *Journal of Applied Polymer Science*, Vol. 52, 491-499 (1994).

TREF Method

Temperature Rising Elution Fractionation (TREF) analysis is done using a Crystallization Elution Fractionation (CEF) instrument from Polymer Char, S. A., Valencia, Spain. The principles of CEF analysis and a general description of the particular apparatus used are given in the article Monrabal, B. et al. Crystallization Elution Fractionation. A New Separation Process for Polyolefin Resins. *Macromol. Symp.* 2007, 257, 71. Pertinent details of the analysis method and features of the apparatus used are as follows.

The solvent used for preparing the sample solution and for elution was 1,2-Dichlorobenzene (ODCB) which was stabilized by dissolving 1.6 g of 2,6-bis(1,1-dimethylethyl)-4-methylphenol (butylated hydroxytoluene) in a 4-L bottle of fresh solvent at ambient temperature. The stabilized solvent was then filtered using a 0.1-µm Teflon filter (Millipore). The sample (6-10 mg) to be analyzed was dissolved in 8 ml of ODCB metered at ambient temperature by stirring (Medium setting) at 150° C. for 90 min. A small volume of the polymer solution was first filtered by an inline filter (stainless steel, 10 m), which is back-flushed after every filtration. The filtrate was then used to completely fill a 200-jl injection-valve loop. The volume in the loop was then introduced near the center of the CEF column (15-cm long SS tubing, ⅜" o.d., 7.8 mm i.d.) packed with an inert support (SS balls) at 140° C., and the column temperature was stabilized at 125° C. for 20 min. The sample volume was then allowed to crystallize in the column by reducing the temperature to 0° C. at a cooling rate of 1° C./min. The column was kept at 0° C. for 10 min before injecting the ODCB flow (1 ml/min) into the column for 10 min to elute and measure the polymer that did not crystallize (soluble fraction). The wide-band channel of the infrared detector used (Polymer Char IR5) generates an absorbance signal that is proportional to the concentration of polymer in the eluting flow. A complete TREF curve was then generated by increasing the temperature of the column from 0 to 140° C. at a rate of 2° C./min while maintaining the ODCB flow at 1 ml/min to elute and measure the concentration of the dissolving polymer.

GPC 4D Procedure: Molecular Weight, Comonomer Composition and Long Chain Branching Determination by GPC-IR Hyphenated with Multiple Detectors Unless otherwise indicated, the distributions and the moments of molecular weight (Mw, Mn, Mw/Mn, etc.), the comonomer content ($C_2$, $C_3$, $C_6$, etc.) and the branching index (g'vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-µm Teflon filter and degassed with an online degasser before entering the GPC instrument. The nominal flow rate is 1.0 ml/min and the nominal injection volume is 200 µL. The whole system including transfer lines, columns, and detectors are contained in an oven maintained at 145° C. The polymer sample is weighed and sealed in a standard vial with 80-µL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=/βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with the following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript are for the test samples. In this method, $\alpha_{PS}=0.67$ and $K_{PS}=0.000175$ while a and K are for other materials as calculated and published in literature (Sun, T. et al. *Macromolecules*, 2001, 34, 6812), except that for purposes of the present disclosure, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, a is 0.695 and K is $0.000579*(1-0.0087*w2b+0.000018*(w2b)^2)$ for ethylene-butene copolymer where w2b is a bulk weight percent of butene comonomer, a is 0.695 and K is $0.000579*(1-0.0075*w2b)$ for ethylene-hexene copolymer where w2b is a bulk weight percent of hexene comonomer, and a is 0.695 and K is $0.000579*(1-0.0077*w2b)$ for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to CH$_2$ and CH$_3$ channel calibrated with a series of PE and PP homo/copolymer standards whose nominal value are predetermined by NMR or FTIR. In particular, this provides the methyls per 1000 total carbons (CH$_3$/1000TC) as a function of molecular weight. The short-chain branch (SCB) content per 1000TC (SCB/1000TC) is then computed as a function of molecular weight by applying a chain-end correction to the CH$_3$/1000TC function, assuming each chain to be linear and terminated by a methyl group at each end. The weight % comonomer is then obtained from the following expression in which f is 0.3, 0.4, 0.6, 0.8, and so on for C$_3$, C$_4$, C$_6$, C$_8$, and so on co-monomers, respectively:

w2=f*SCB/1000TC.

The bulk composition of the polymer from the GPC-IR and GPC-4D analyses is obtained by considering the entire signals of the CH$_3$ and CH$_2$ channels between the integration limits of the concentration chromatogram. First, the following ratio is obtained $$\text{Bulk } IR \text{ ratio} = \frac{\text{Area of CH}_3 \text{ signal within integration limits}}{\text{Area of CH}_2 \text{ signal within integration limits}}.$$

Then the same calibration of the CH$_3$ and CH$_2$ signal ratio, as mentioned previously in obtaining the CH3/1000TC as a function of molecular weight, is applied to obtain the bulk CH$_3$/1000TC. A bulk methyl chain ends per 1000TC (bulk CH$_3$ end/1000TC) is obtained by weight-averaging the chain-end correction over the molecular-weight range. Then w2b=f*bulk CH3/1000TC bulk SCB/1000TC=bulk CH3/1000TC−bulk CH$_3$ end/1000TC and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [$\eta$], at each point in the chromatogram is calculated from the equation [$\eta$]=$\eta_S$/c, where c is concentration and is determined from the IR5 broadband channel output. The viscosity MW at each point is calculated as $M = K_{PS} M^{\alpha_{PS}+1}/[\eta]$, where $\alpha_{ps}$ is 0.67 and $K_{PS}$ is 0.000175.

The branching index (g'vis) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits. The branching index g'vis is defined as $$g'_{vis} = \frac{[\eta]_{avg}}{K M_v^\alpha},$$

where $M_V$ is the viscosity-average molecular weight based on molecular weights determined by LS analysis and the K and a are for the reference linear polymer, which are, for purposes of the present disclosure, $\alpha$=0.695 and K=0.000579 for linear ethylene polymers, $\alpha$=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $C_3$, 4 for $C_4$, 6 for $C_6$, etc.):

$$x2 = -\frac{200\,w2}{-100n - 2w2 + nw2}.$$

Then the molecular-weight distribution, W(z) where z=$\log_{10}$ M, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W'\,dz,$$

and a modified weight-average molecular weight (Mw') is calculated over the effectively reduced range of molecular weights as follows:

$$M_w' = \int_{-\infty}^{\infty} 10^z * W'\,dz.$$

The RCI,m is then computed as $$\mathrm{RCI},m = \int_{-\infty}^{\infty} x2(10^z - M_w')W'\,dz.$$

A reversed-co-monomer index (RCI,w) is also defined on the basis of the weight fraction co-monomer signal (w2/100) and is computed as follows:

$$\mathrm{RCI},w = \int_{-\infty}^{\infty} \frac{w2}{100}(10^z - M_w')W'\,dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$\mathrm{CDR\text{-}1},w = \frac{w2(Mz)}{w2(Mw)},$$

$$\mathrm{CDR\text{-}2},w = \frac{w2(Mz)}{w2\left(\frac{Mw+Mn}{2}\right)},$$

$$\mathrm{CDR\text{-}3},w = \frac{w2\left(\frac{Mz+Mw}{2}\right)}{w2\left(\frac{Mw+Mn}{2}\right)},$$

where w2(Mw) is the % weight co-monomer signal corresponding to a molecular weight of Mw, w2(Mz) is the % weight co-monomer signal corresponding to a molecular weight of Mz, w2[(Mw+Mn)/2] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as:

$$\mathrm{CDR\text{-}1},m = \frac{x2(Mz)}{x2(Mw)},$$

$$\mathrm{CDR\text{-}2},m = \frac{x2(Mz)}{x2\left(\frac{Mw+Mn}{2}\right)},$$

$$\mathrm{CDR\text{-}3},m = \frac{x2\left(\frac{Mz+Mw}{2}\right)}{x2\left(\frac{Mw+Mn}{2}\right)},$$

where x2(Mw) is the % mole co-monomer signal corresponding to a molecular weight of Mw, x2(Mz) is the % mole co-monomer signal corresponding to a molecular weight of Mz, x2[(Mw+Mn)/2] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

All molecular weights are weight average (Mw) unless otherwise noted. All molecular weights are reported in g/mol unless otherwise noted.

Melt index (MI) also referred to as $I_2$, reported in g/10 min, is determined according to ASTM D1238, 190° C., 2.16 kg load.

High load melt index (HLMI) also referred to as $I_{21}$, reported in g/10 min, is determined according to ASTM D1238, 190° C., 21.6 kg load.

Melt index ratio (MIR) is HLMI divided by MI as determined by ASTM D1238.

In at least one embodiment, a polymer formed by a polymerization process of the present disclosure has a melt index ratio of from 15 to 140, such as from 15 to 100, such as from 20 to 40 or from 80 to 110.

An "in-situ polymer composition" (also referred to as an "in-situ blend" or a "reactor blend") is the composition which is the product of a polymerization with two catalyst compounds in the same reactor described herein. Without wishing to be bound by theory it is thought that the two catalyst compounds produce a reactor blend (i.e., an interpenetrating network) of two (or more) components made in the same reactors (or reactions zones) with the two catalysts. These sorts of compositions may be referred to as reactor blends, although the term may not be strictly accurate since there may be polymer species comprising components produced by each catalyst compound that are not technically a blend.

An "ex-situ blend" is a blend which is a physical blend of two or more polymers synthesized independently and then subsequently blended together typically using a melt-mixing process, such as an extruder. An ex-situ blend is distinguished by the fact that the polymer components are collected in solid form after exiting their respective synthesis processes, and then combined to form the blend; whereas for an in-situ polymer composition, the polymer components are prepared within a common synthesis process and only the combination is collected in solid form.

In at least one embodiment, the polymer composition produced is an in-situ polymer composition.

In at least one embodiment, the polymer produced is an in-situ polymer composition having an ethylene content of 70 wt % or more, such as 80 wt % or more, such as 90 wt % or more and/or a density of 0.910 or more, alternatively 0.93 g/cc or more; alternatively 0.935 g/cc or more, alternatively 0.938 g/cc or more.

In at least one embodiment, the polymer produced is an in-situ polymer composition having a density of 0.910 g/cc or more, alternatively from 0.935 to 0.960 g/cc.

In at least one embodiment, the polymer produced by the processes described herein comprises ethylene and one or more comonomers and the polymer has: 1) an RCI,m greater than 30 (alternatively greater than 30 to 50), an Mw/Mn of greater than 3, and optionally a $T_{75}$-$T_{25}$ of 15 to 20° C.; or 2) an RCI,m greater than 50 (alternatively greater than 80), an Mw/Mn of greater than 5 (alternatively from 5 to 10), and optionally a $T_{75}$-$T_{25}$ of from 25 to 75° C., such as from 45 to 75° C., such as from 25 to 45° C.

In at least one embodiment, when:
1) the compound represented by formula (A) is run under the same polymerization conditions as a supported two catalyst composition described herein, except that the compound represented by formula (B) is absent, a polymer having an RCI,m of 20 or more is produced; and
2) the compound represented by formula (B) is run under the same polymerization conditions as step 1), except that the compound represented by formula (A) is absent, a polymer having an RCI,m of less than zero is produced.

In at least one embodiment, a linear low density polyethylene may be produced by using the supported catalyst systems (C) described herein (e.g., having activator and two catalysts (A) and (B) supported on the same support) where the LLDPE has: a) an RCI,m greater than 30 (alternatively greater than 30 to 50), an Mw/Mn of greater than 3 to less than 5, and optionally a $T_{75}$-$T_{25}$ of 15-20° C.; or b) an RCI,m greater than 50 (alternatively greater than 80) and an Mw/Mn of greater than 5 (optionally of greater than 5 to 10), and optionally a $T_{75}$-$T_{25}$ of from 25 to 75° C., such as from 45 to 75° C., such as from 25 to 45° C., provided that:
1) when the supported compound represented by formula (A) is run under the same polymerization conditions as the supported catalyst system (C) except that the compound represented by formula (B) is absent, an ethylene polymer is produced having an RCI,m greater than 20; and
2) when the supported compound represented by formula (B) is run under the same conditions as step 1) except that the compound (A) is absent, an ethylene polymer is produced having a negative RCI,m.

To obtain polymers having higher RCI,m's (such as 50 and above) select catalyst compounds represented by formula (A) that produce high comonomer content and or high Mw/Mn.

In at least one embodiment, a polymer of the present disclosure has a PDI of from 1 to about 12, such as from 1 to 5, such as from 3 to 11, such as from 6 to 9.

In at least one embodiment, a polymer of the present disclosure has a high degree of internal unsaturation. In at least one embodiment, a polymer has an internal unsaturation of less than 50% of the total unsaturations, such as less than 40% such as less than 30%. Internal unsaturation can be promoted by increasing the amount of the catalyst represented by formula (A) (as compared the amount of the catalyst represented by formula (B)) in a catalyst system of the present disclosure. Polymers having a high degree of internal unsaturation can provide a g'vis of 0.95 or more. Internal unsaturation can disrupt the crystallization of ethylene chains and contribute to the amorphous phase of the PE resin which may contribute to increased impact strength of the polymer.

Polymers of the present disclosure can also have a high degree of terminal unsaturation, e.g., vinylogous end groups. In at least one embodiment, a polymer has a terminal unsaturation of 50% or more of the total unsaturations, such as 60% or more, such as 70% or more, alternately from 50 to 90%, from 60 to 85%, from 60 to 80%. Terminal unsaturation can be promoted by increasing the amount of the catalyst represented by formula (B) (as compared the amount of the catalyst represented by formula (A)) in a catalyst system of the present disclosure. Terminal unsaturation can provide reactive end groups of polymers for functionalization.

In at least one embodiment, a polymer of the present disclosure has a combination of internal and terminal unsaturation of greater than 0.7 unsaturations per 1000 carbon atoms, such as greater than 0.8, such as greater than 0.9.

In at least one embodiment, a polymer of the present disclosure has a ratio of terminal unsaturation to internal unsaturation of from 1:5 to 20:1, such as from 1:1 to 20:1, such as from 5:1 to 15:1, such as from 8:1 to 12:1, such as about 9:1.

Unsaturation (internal and terminal) in a polymer can be determined by $^1$H NMR with reference to *Macromolecules* 2014, 47, 3782 and *Macromolecules*, 2005, 38, 6988, but in event of conflict *Macromolecules*, 2014, 47, 3782 shall control. Peak assignments are determined referencing the solvent of tetrachloroethane-1,2 $d_2$ at 5.98 ppm. Specifically, percent internal unsaturation is determined by adding Vy1+ Vy2+trisubstituted olefins then dividing by total unsaturation.

In at least one embodiment, a polymer of the present disclosure has a g'vis of greater than 0.9, such as greater than 0.92, such as greater than 0.95.

In at least one embodiment, a polymer of the present disclosure has a RCI,m greater than 50, such as greater than 55, such as greater than 60.

End Uses

Any of the foregoing polymers and compositions in combination with optional additives (see, for example, U.S.

Publication No. 2016/0060430, paragraphs [0082]-[0093]) may be used in a variety of end-use applications. Such end uses may be produced by suitable methods. End uses include polymer products and products having specific end-uses. Exemplary end uses are films, film-based products, diaper backsheets, housewrap, wire and cable coating compositions, articles formed by molding techniques, e.g., injection or blow molding, extrusion coating, foaming, casting, and combinations thereof. End uses also include products made from films, e.g., bags, packaging, and personal care films, pouches, medical products, such as for example, medical films and intravenous (IV) bags.

Films

Films include monolayer or multilayer films. Films include those suitable film structures and film applications. Specific end use films include, for example, blown films, cast films, stretch films, stretch/cast films, stretch cling films, stretch hand wrap films, machine stretch wrap, shrink films, shrink wrap films, green house films, laminates, and laminate films. Exemplary films are prepared by any conventional technique, such as for example, techniques utilized to prepare blown, extruded, and/or cast stretch and/or shrink films (including shrink-on-shrink applications).

In one embodiment, multilayer films or multiple-layer films may be formed by any suitable method. The total thickness of multilayer films may vary based upon the application desired. A total film thickness of about 5-100 µm, more typically about 10-50 µm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes. Exemplary multilayer films have at least two, at least three, or at least four layers. In one embodiment the multilayer films are composed of five to ten layers.

To facilitate discussion of different film structures, the following notation is used herein. Each layer of a film is denoted "A" or "B". Where a film includes more than one A layer or more than one B layer, one or more prime symbols (', ", '", etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer film having an inner layer positioned between two outer layers would be denoted A/B/A'. Similarly, a five-layer film of alternating layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes described herein. The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 µm each and a B layer of 30 µm is denoted as 20/60/20.

The thickness of each layer of the film, and of the overall film, is not particularly limited, but is determined according to the desired properties of the film. Suitable film layers can have a thickness of from about 1 to about 1000 µm, more typically from about 5 to about 100 µm, and typical films have an overall thickness of from about 10 to about 100 µm.

In some embodiments, and using the nomenclature described above, the present disclosure provides for multilayer films with any of the following exemplary structures: (a) two-layer films, such as A/B and B/B'; (b) three-layer films, such as A/B/A', A/A'/B, B/A/B' and B/B'/B"; (c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"/B'''; (d) five-layer films, such as A/A'/A"/A'''/B, A/A'/A"/B/A''', A/A'/B/A"/A''', A/A'/A"/B/B', A/A'/B/A"/B', A/A'/B/B'/A", A/B/A'/B'/A", A/B/A'/A"/B, B/A/A'/A"/B', A/A'/B/B'/B", A/A'/B'/B", A/B/A'/B"/A', B/A/A'/B'/B", B/A/B'/A'/B", B/A/B'/B"/A', A/B/B'/B"/B''', B/A/B'/B"/B''', B/B'/A/B"/B''', and B/B'/B"/B'''/B''''; and similar structures for films having six, seven, eight, nine, twenty-four, forty-eight, sixty-four, one hundred, or any other number of layers. It should be appreciated that films having still more layers.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films may also be used as coatings for substrates such as paper, metal, glass, plastic, and other materials capable of accepting a coating.

The films can further be embossed, or produced or processed according to other suitable film processes. The films can be tailored to specific applications by adjusting the thickness, materials and order of the various layers, as well as the additives in or modifiers applied to each layer.

In a class of embodiments, a film (e.g., blown or cast) made from the polyethylene composition as described above, may a have:

1) a relationship between MD and TD modulus (in accordance with the test method described below) and density that satisfies the following equation:

Avg. Modulus ≥1.2*(Constant 1(C1)*Density−Constant 2(C2); and 2) a seal initiation temperature (in accordance with the test method described below) at 1 N of ≤98.0° C.

For example, the relationship between MD and TD modulus and densities may be as follows:

Average Modulus≥1.2*(2,065,292*Density−1,872,345).

In at least one embodiment, the seal initiation temperature (see below for the test method) at 1 N may be ≤99.0° C., ≤98.0° C., ≤97.0° C., ≤96.0° C., ≤95.0° C., or ≤94.0° C.

In at least one embodiment, the seal initiation temperature (see below for the test method) at 5 N is ≤103.0° C., ≤102.0° C., ≤101.0° C., ≤100.0° C., ≤99.0° C., or ≤98.0° C.

In at least one embodiment, the film may exhibit an average of the MD and TD 1% secant modulus (see below for the test method) of 30,000 psi or greater, such as 35,000 psi or greater, such as 40,000 psi or greater, such as 45,000 psi or greater, such as 50,000 psi or greater, such as from 30,000 psi to 120,000 psi, such as from 35,000 psi to 60,000 psi, such as from 40,000 psi to 50,000 psi.

A film of the present disclosure also has a Dart Drop Impact (or Dart F50 or Dart Drop Impact Strength (DIS), reported in grams (g) or grams per mil (g/mil), in accordance with ASTM D-1709, method A, using a phenolic probe. For example, a film has a Dart Drop Impact of at least 100 g/mil, such as at least 200 g/mil, such as at least 300 g/mil, such as at least 400 g/mil, such as at least 500 g/mil, such as at least 600 g/mil, such as at least 650 g/mil, and such as at least 700 g/mil. For example, the Dart Drop Impact can be from 100 g/mil to 1,100 g/mil, such as 400 g/mil to 1,000 g/mil, such as from 900 g/mil to 1,000 g/mil, or from 650 g/mil to 725 g/mil.

A film of the present disclosure also has a Tensile Strength (according to ASTM D-882, 25.4 mm width strip), reported in pounds per square inch (psi). For example, a film has a tensile strength in the machine direction (MD) of from 3,000 psi to 12,000 psi, such as from 5,000 psi to 11,000 psi, such as from 6,000 psi to 9,000 psi, such as from 7,000 psi to 8,500 psi, such as from 7,500 psi to 8,500 psi. In at least one embodiment, a film has a tensile strength in the transverse direction (TD) of from 3,000 psi to 12,000 psi, such as from 5,000 psi to 11,000 psi, such as from 7,000 psi to 10,000 psi, such as from 7,500 psi to 9,000 psi.

A film of the present disclosure also has a Tensile Strength at Yield (according to ASTM D-882 with a crosshead speed of 50 mm/min), reported in pounds per square inch (psi). For example, a film has a Tensile Strength at Yield in the machine direction (MD) of from 500 psi to 4,000 psi, such as 500 psi to 3,000 psi, such as 1,000 psi to 2,000 psi, such as 1,250 psi to 1,750 psi. In at least one embodiment, a film has a Tensile Strength at Yield in the transverse direction (TD) of from 500 psi to 4,000 psi, such as 1,000 psi to 3,000 psi, such as 1,500 psi to 2,500 psi, such as 1,750 psi to 2,250 psi.

A film of the present disclosure also has an Elongation at Break (according to ASTM D-882, 25.4 mm width strip), reported in percent (%). For example, a film has an Elongation at Break in the machine direction (MD) of from 200% to 600%, such as from 250% to 500%, such as from 300% to 450%, such as from 350% to 425%. In at least one embodiment, a film has an Elongation at Break in the transverse direction (TD) of from 400% to 800%, such as from 450% to 750%, such as from 500% to 700%, such as from 550% to 650%.

A film of the present disclosure also has an Elmendorf Tear value, in accordance with ASTM D-1922. For example, a film has an Elmendorf Tear value in the machine direction (MD) of from 10 g/mil to 300 g/mil, such as from 50 g/mil to 250 g/mil, such as from 100 g/mil to 250 g/mil, such as from 125 g/mil to 250 g/mil or from 125 g/mil to 175 g/mil. In at least one embodiment, a film has an Elmendorf Tear value in the transverse direction (TD) of from 300 g/mil to 1200 g/mil, such as from 400 g/mil to 1,000 g/mil, such as from 400 g/mil to 900 g/mil, such as from 500 g/mil to 800 g/mil or from 600 g/mil to 700 g/mil.

The performance of the polymer composition being formed into a film can be characterized as a Maximum Die Rate. The "Maximum Die Rate" is a normalized extrusion rate by die size which is commonly used in the blown film industry. The Maximum Die Rate as used herein is expressed as: Maximum Die Rate [lb/in-hr]=Extrusion Rate [lb/hr]/Die Circumference [inch]. The metric definition of the Maximum Die Rate is expressed as: Maximum Die Rate [kg/mm-hr]=Extrusion Rate [kg/hr]/Die Diameter [mm]. The Maximum Die Rate at which the film is formed can be greater than 8 lb/in-hr or 13 lb/in-hr (0.73 kg/mm-hr) or 16 lb/in-hr (0.90 kg/mm-hr) or 24 lb/in-hr (1.34 kg/mm-hr), or within a range from 13 lb/in-hr (0.73 kg/mm-hr), or 16 lb/in-hr (0.90 kg/mm-hr), or 24 lb/in-hr (1.34 kg/mm-hr) to 30 (1.69 kg/mm-hr), or 40 lb/in-hr (2.25 kg/mm-hr); and the Maximum Rate of extrusion can be within a range from 350 lb/hr (159 kg/hr) to about 500 lb/hr (227 kg/hr). Note that for the "Maximum Die Rate" in the English unit, the die dimension is the die circumference, while in metric unit, the die dimension is the die diameter. Thus, for die factor in lb/in-hr, the full expression is lb/die circumference (in unit of inch)/hr; and for die factor in kg/mm-hr, the full expression is kg/die diameter (in unit of mm)/hr.

In at least one embodiment, a film of the present disclosure has a haze, according to ASTM D-1003, of 20% or less, such as 15% or less, such as 10% or less, such as from about 1% to about 12%, such as from about 6% to about 12%, such as from about 7% to about 11%.

Stretch Films

The polymers and compositions as described above may be utilized to prepare stretch films. Stretch films are widely used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can be monolayer films or multilayer films, and can include conventional additives, such as cling-enhancing additives such as tackifiers, and non-cling or slip additives, to tailor the slip/cling properties of the film.

Shrink Films

The polymers and compositions as described above may be utilized to prepare shrink films. Shrink films, also referred to as heat-shrinkable films, are widely used in both industrial and retail bundling and packaging applications. Such films are capable of shrinking upon application of heat to release stress imparted to the film during or subsequent to extrusion. The shrinkage can occur in one direction or in both longitudinal and transverse directions. Conventional shrink films are described, for example, in WO 2004/022646.

Industrial shrink films are commonly used for bundling articles on pallets. Typical industrial shrink films are formed in a single bubble blown extrusion process to a thickness of about 80 μm to 200 μm, and provide shrinkage in two directions, typically at a machine direction (MD) to transverse direction (TD) ratio of about 60:40.

Retail films are commonly used for packaging and/or bundling articles for consumer use, such as, for example, in supermarket goods. Such films are typically formed in a single bubble blown extrusion process to a thickness of about 35 μm to 80, μm, with a typical MD:TD shrink ratio of about 80:20.

Films may be used in "shrink-on-shrink" applications. "Shrink-on-shrink," as used herein, refers to the process of applying an outer shrink wrap layer around one or more items that have already been individually shrink wrapped (herein, the "inner layer" of wrapping). In these processes, it is desired that the films used for wrapping the individual items have a higher melting (or shrinking) point than the film used for the outside layer. When such a configuration is used, it is possible to achieve the desired level of shrinking in the outer layer, while preventing the inner layer from melting, further shrinking, or otherwise distorting during shrinking of the outer layer. Some films described herein have been observed to have a sharp shrinking point when subjected to heat from a heat gun at a high heat setting, which indicates that they may be especially suited for use as the inner layer in a variety of shrink-on-shrink applications.

Greenhouse Films

The polymers and compositions as described above may be utilized to prepare stretch to prepare greenhouse films. Greenhouse films are generally heat retention films that, depending on climate requirements, retain different amounts of heat. Less demanding heat retention films are used in warmer regions or for spring time applications. More demanding heat retention films are used in the winter months and in colder regions.

Bags

Bags include suitable bag structures and bag applications. Exemplary bags include shipping sacks, trash bags and liners, industrial liners, produce bags, and heavy duty bags.

Packaging

Packaging includes suitable packaging structures and packaging applications. Exemplary packaging includes flexible packaging, food packaging, e.g., fresh cut produce packaging, frozen food packaging, bundling, packaging and unitizing a variety of products. Applications for such packaging include various foodstuffs, rolls of carpet, liquid containers, and various like goods normally containerized and/or palletized for shipping, storage, and/or display.

Blow Molded Articles

The polymers and compositions described above may also be used in blow molding processes and applications. Such processes involve a process of inflating a hot, hollow thermoplastic preform (or parison) inside a closed mold. In this manner, the shape of the parison conforms to that of the mold cavity, enabling the production of a wide variety of hollow parts and containers.

In a typical blow molding process, a parison is formed between mold halves and the mold is closed around the parison, sealing one end of the parison and closing the parison around a mandrel at the other end. Air is then blown through the mandrel (or through a needle) to inflate the parison inside the mold. The mold is then cooled and the part formed inside the mold is solidified. Finally, the mold is opened and the molded part is ejected. The process lends itself to any design having a hollow shape, including but not limited to bottles, tanks, toys, household goods, automobile parts, and other hollow containers and/or parts.

Blow molding processes may include extrusion and/or injection blow molding. Suitable extrusion blow molding can be suited for the formation of items having a comparatively heavy weight, such as greater than about 12 ounces, including but not limited to food, laundry, or waste containers. Suitable injection blow molding can be typically used to achieve accurate and uniform wall thickness, high quality neck finish, and to process polymers that cannot be extruded. Suitable injection blow molding applications include, but are not limited to, pharmaceutical, cosmetic, and single serving containers, such as weighing less than 12 ounces.

Injection Molded Articles

The polymers and compositions described above may also be used in injection molded applications. Injection molding is a process that usually occurs in a cyclical fashion. Cycle times generally range from 10 to 100 seconds and are controlled by the cooling time of the polymer or polymer blend used.

In an injection molding cycle, polymer pellets or powder are fed from a hopper and melted in a reciprocating screw type injection molding machine. The screw in the machine rotates forward, filling a mold with melt and holding the melt under high pressure. As the melt cools in the mold and contracts, the machine adds more melt to the mold to compensate. Once the mold is filled, it is isolated from the injection unit and the melt cools and solidifies. The solidified part is ejected from the mold and the mold is then closed to prepare for the next injection of melt from the injection unit.

Injection molding processes offer high production rates, good repeatability, minimum scrap losses, and little to no need for finishing of parts. Injection molding is suitable for a wide variety of applications, including containers, household goods, automobile components, electronic parts, and many other solid articles.

Extrusion Coating

The polymers and compositions described above may be used in extrusion coating processes and applications. Extrusion coating is a plastic fabrication process in which molten polymer is extruded and applied onto a non-plastic support or substrate, such as paper or aluminum in order to obtain a multi-material complex structure. This complex structure can combine toughness, sealing and resistance properties of the polymer formulation with barrier, stiffness or aesthetics attributes of the non-polymer substrate. In this process, the substrate can be fed from a roll into a molten polymer as the polymer is extruded from a slot die, which is similar to a cast film process. The resultant structure is cooled, such as with a chill roll or rolls, and wound into finished rolls.

Extrusion coating materials can be used in food and non-food packaging, pharmaceutical packaging, and manufacturing of goods for the construction (insulation elements) and photographic industries (paper).

Foamed Articles

The polymers and compositions described above may be foamed articles. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product can be light, strong, and suitable for use in a wide range of applications in industries such as packaging, automotive, aerospace, transportation, electric and electronics, and manufacturing.

Wire and Cable Applications

Also provided are electrical articles and devices including one or more layers formed of or comprising the polymers and compositions described above. Such devices include, for example, electronic cables, computer and computer-related equipment, marine cables, power cables, telecommunications cables or data transmission cables, and combined power/telecommunications cables.

Electrical devices described herein can be formed by suitable methods, such as by one or more extrusion coating steps in a reactor/extruder equipped with a cable die. Such cable extrusion apparatus and processes are well known. In an extrusion method, an optionally heated conducting core is pulled through a heated extrusion die, typically a crosshead die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

The multi-modal polyolefin produced by the processes of the present disclosure and blends thereof are useful in such forming operations as film, sheet, and fiber extrusion and co-extrusion as well as blow molding, injection molding, and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Specifically, any of the foregoing polymers, such as the foregoing ethylene copolymers or blends thereof, may be used in mono- or multi-layer blown, extruded, and/or shrink films. These films may be formed by any number of suitable extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents.

Blends

The polymers produced herein may be further blended with additional ethylene polymers (referred to as "second ethylene polymers" or "second ethylene copolymers") and use in film, molded part and other typical polyethylene applications.

In one aspect of the present disclosure, the second ethylene polymer is selected from ethylene homopolymer, ethylene copolymers, and blends thereof. Useful second ethylene copolymers can comprise one or more comonomers in addition to ethylene and can be a random copolymer, a statistical copolymer, a block copolymer, and/or blends thereof. The method of making the second ethylene polymer is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In at least one embodiment, the second ethylene polymers are made by the catalysts, activators and processes described in U.S. Pat. Nos. 6,342,566; 6,384,142; 5,741,563; PCT Publication Nos. WO 03/040201; and WO 97/19991. Such catalysts are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000). Additional useful second ethylene polymers and copolymers are described at paragraph [00118] to [00126] at pages 30 to 34 of PCT/US2016/028271, filed Apr. 19, 2016.

EXAMPLES

Test Methods $^1$H NMR $^1$H NMR data was collected at 120° C. using a 10 mm CryoProbe with a Bruker spectrometer at a $^1$H frequency of 600 MHz (available from Bruker Corporation, United Kingdom). Data were recorded using a maximum pulse width of 45°, 5 seconds between pulses and signal averaging 512 transients. Samples were prepared by dissolving 80 mg of sample in 3 mL of solvent heated at 140° C. For purposes of the present disclosure and the claims thereto, unsaturations in a polymer are determined by $^1$H NMR with reference to Macromolecules, 2014, vol. 47, p. 3782 and Macromolecules, 2005, vol. 38, p. 6988, but in event of conflict Macromolecules, 2014, vol. 47, p. 3782, shall control. Peak assignments are determined referencing the solvent of tetrachloroethane-1,2 d2 at 5.98 ppm.

TREF Method

Unless otherwise indicated, the TREF-LS data reported herein were measured using an analytical size TREF instrument (Polymerchar, Spain), with a column of the following dimension: inner diameter (ID) 7.8 mm and outer diameter (OD) 9.53 mm and a column length of 150 mm. The column was filled with steel beads. 0.5 mL of a 6.4% (w/v) polymer solution in orthodichlorobenzene (ODCB) containing 6 g BHT/4 L were charged onto the column and cooled from 140° C. to 25° C. at a constant cooling rate of 1.0° C./min. Subsequently, the ODCB was pumped through the column at a flow rate of 1.0 ml/min and the column temperature was increased at a constant heating rate of 2° C./min to elute the polymer. The polymer concentration in the eluted liquid was detected by means of measuring the absorption at a wavenumber of 2857 cm$^1$ using an infrared detector. The concentration of the ethylene-α-olefin copolymer in the eluted liquid was calculated from the absorption and plotted as a function of temperature. The molecular weight of the ethylene-α-olefin copolymer in the eluted liquid was measured by light scattering using a Minidawn Tristar light scattering detector (Wyatt, Calif., USA). The molecular weight was also plotted as a function of temperature.

Cross-Fractionation Chromatography (CFC)

Cross-fractionation chromatography (CFC) analysis was done using a CFC-2 instrument from Polymer Char, S.A., Valencia, Spain. The principles of CFC analysis and a general description of the particular apparatus used are given in the article by Ortin, A.; Monrabal, B.; Sancho-Tello, 257 J. Macromol. Symp. 13 (2007). Details of the analysis method and features of the apparatus used are as follows.

The solvent used for preparing the sample solution and for elution was 1,2-Dichlorobenzene (ODCB) which was stabilized by dissolving 2 g of 2,6-bis(1,1-dimethylethyl)-4-methylphenol (butylated hydroxytoluene) in a 4-L bottle of fresh solvent at ambient temperature. The sample to be analyzed (25-125 mg) was dissolved in the solvent (25 ml metered at ambient temperature) by stirring (200 rpm) at 150° C. for 75 min. A small volume (0.5 ml) of the solution was introduced into a TREF column (stainless steel; o.d., ⅜"; length, 15 cm; packing, non-porous stainless steel micro-balls) at 150° C., and the column temperature was stabilized for 30 min at a temperature (120-125° C.) approximately 20° C. higher than the highest-temperature fraction for which the GPC analysis was included in obtaining the final bivariate distribution. The sample volume was then allowed to crystallize in the column by reducing the temperature to an appropriate low temperature (30, 0, or −15° C.) at a cooling rate of 0.2° C./min. The low temperature was held for 10 min before injecting the solvent flow (1 ml/min) into the TREF column to elute the soluble fraction (SF) into the GPC columns (3×PLgel 10 μm Mixed-B 300×7.5 mm, Agilent Technologies, Inc.); the GPC oven was held at high temperature (140° C.). The SF was eluted for 5 min from the TREF column and then the injection valve was put in the "load" position for 40 min to completely elute all of the SF through the GPC columns (standard GPC injections). All subsequent higher-temperature fractions were analyzed using overlapped GPC injections wherein at each temperature step the polymer was allowed to dissolve for at least 16 min and then eluted from the TREF column into the GPC column for 3 min. The IR4 (Polymer Char) infrared detector was used to generate an absorbance signal that is proportional to the concentration of polymer in the eluting flow.

The universal calibration method was used for determining the molecular weight distribution (MWD) and molecular-weight averages ($M_n$, $M_w$, etc.) of eluting polymer fractions. Thirteen narrow molecular-weight distribution polystyrene standards (obtained from Agilent Technologies, Inc.) within the range of 1.5-8200 kg/mol were used to generate a universal calibration curve. Mark-Houwink parameters were obtained from Appendix I of Mori, S.; Barth, H. G. Size Exclusion Chromatography; Springer, 1999. For polystyrene $K=1.38\times10^{-4}$ dl/g and $\alpha=0.7$; and for polyethylene $K=5.05\times10^{-4}$ dl/g and $\alpha=0.693$ were used. For a polymer fraction, which eluted at a temperature step, that has a weight fraction (wt % recovery) of less than 0.5%, the MWD and the molecular-weight averages were not computed; additionally, such polymer fractions were not included in computing the MWD and the molecular-weight averages of aggregates of fractions.

Additional test methods include the following.

All reactions were performed in an inert $N_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (2.5 M solution in hexane), dimethylsilyl dichloride ($Me_2SiCl_2$) and methylmagnisium bromide (3.0 M solution in diethyl ether) were purchased from Sigma-Aldrich. Hafnium tetrachloride ($HfCl_4$) 99+% and (trimethylsilyl)methyl trifluoromethanesulfonate were procured from Strem Chemicals and TCI America, respectively, and used as received. Potassium cyclopentadiene (KCp) was prepared according to literature methods. n-Butyl lithium (2.5 M solution in hexane), iodomethane, indene and methyllithium (1.6 M solution in diethyl ether) were purchased from Sigma-Aldrich, and pentamethylcyclopentadienylzirconium trichloride ($Cp^*ZrCl_3$) was purchased from Strem Chemicals and used as received. 1-Methylindene and lithium-1-methylindene were prepared according to the literature

TABLE 1

| Test Name | Method |
| --- | --- |
| Melt Index (MI) | ASTM D-1238 2.16 kg (190° C.) ($I_2$) or ($I_{2.16}$) |
| High Load Melt Index (HLMI) | ASTM D-1238 21.6 kg (190° C.) ($I_{21}$) or ($I_{21.6}$) |
| Melt Index Ratio (MIR) | $I_{21}/I_2$ |
| Density | ASTM D1505, column density. Samples were molded under ASTM D4703-10a, Procedure C, then conditioned under ASTM D618-08 (23° ± 2° C. and 50 ± 10% Relative Humidity) for 40 Hours before testing |
| 1% Secant Modulus | Modified ASTM D-882, sample conditioning*, 1" strip, 4" length |
| Yield Strength | Modified ASTM D-882, sample conditioning*, 1" strip, 4" sample length |
| Tensile Strength | Modified ASTM D-882, sample conditioning*, 1" strip, 4" sample length |
| Elongation at Break | Modified ASTM D-882, sample conditioning*, 1" strip, 4" sample length |
| Elongation at Yield | Modified ASTM D-882, sample conditioning*, 1" strip, 4" sample length |
| Dart Drop | Modified ASTM D-1709, Phenolic, Method A. Sample conditioning in the lab, calculation uses last 10 passes and 10 fails |
| Haze | ASTM D-1003 |
| Gloss, 45° | ASTM D-2457 |
| Elmendorf Tear | ASTM D1922 with ASTM Conditioning for 40 Hours at 23° ± 2° C. and 50 ± 10% Relative Humidity |
| Puncture | Modified ASTM D5748. EXXONMOBIL probe was used with two 0.25 mil HDPE slip sheets. Machine Model: United SFM-1. Testing speed: 10 in/min. |
| $^1$HNMR | Unsaturations in a polymer and specifically percent internal unsaturation are determined by $^1$H NMR with reference to 38 MACROMOLECULES 6988 (2005), and 47 MACROMOLECULES 3782 (2014). (see $^1$H NMR section) |
| Heat Seal | 1 inch film strip of 1 mil gauge, sealed at various temperatures under 73 psi (0.5N/mm$^2$) for 1 second. Following ASTM Conditioning for 40 Hours at 23° ± 2° C. and 50 ± 10% Relative Humidity, the sealed specimen were tested in T-joint peel mode at 20 inch/min pulling speed. |
| Hot tack | 1 inch film strip of 1 mil gauge, sealed at various temperatures under 73 psi (0.5N/mm$^2$) for 0.5 second. After a 0.4 second delay, the sealed specimen were pulled at 200 mm/speed in T-joint peel mode. |

*the samples are cut from the rolls, placed between sheets of paper, and then placed on the counter before testing. Samples conditioned according to ASTM for 40 hours at 23° ± 2° C. and 50 ± 10% Relative Humidity.
** Tensile strength refers to the maximum strength reached, most often occurs at sample break. Yield occurs early in the testing where the load reaches a local maximum. For PE, most times yield strength will be surpassed by tensile strength later in deformation, but sometimes sample breaks soon after yield without any strengthening, then yield strength and the tensile strength are the same.

methods. The $^1$H NMR measurements were recorded on a 400 MHz Bruker spectrometer.

Synthesis of (Trimethylsilyl) methylcyclopentadiene, (Me$_3$Si)CH$_2$CpH

A neat (trimethylsilyl)methyl trifluoromethanesulfonate (10.57 g, 44.7 mmol) was dissolved in 150 mL of diethyl ether and cooled to −25° C., to this a solid potassium cyclopentadienide (4.66 g, 44.7 mmol) was slowly added over a period of 5-10 minutes. The resulting mixture was stirred 5 hours at room temperature. Volatiles from the reaction mixture were carefully removed under dynamic vacuum to avoid evaporating the volatile (trimethylsilyl) methylcyclopentadiene, (Me$_3$Si)CH$_2$CpH. The reaction flask (250 mL round bottom flask) and frit with celite were weighted to calculate yield of the product after extraction. The crude materials were extracted into pentane (3×10 mL) and used without any further purification. Based on above mathematical method, the yield is calculated as 5.55 g (81.6%). The $^1$H NMR spectrum was recorded for the crude material to ensure the product formation. $^1$H NMR (400 MHz, C$_6$D$_6$): 6-0.05 (9H, s, Si—CH$_3$), 1.77 (2H, d, J$_{HH}$=1.2 Hz, Me$_3$Si—CH$_2$), 2.83 (1H, sex, J$_{HH}$=1.5 Hz, Cp-CH), 5.80-6.49 (4H, m, Cp-CH) ppm.

Synthesis of Lithium (trimethylsilyl) methylcyclopentadienide, (Me$_3$Si)CH$_2$CpLi A hexane solution of n-butyl lithium (14.6 mL, 36.5 mmol) was added drop-wise to a precooled solution (pentane and diethyl ether, 50/50 mL) of (Me$_3$Si)CH$_2$CpH (5.55 g, 36.5 mmol) over a period of 15-20 minutes at −25° C. The resulting mixture was gradually brought to room temperature and then continuously stirred overnight. Volatiles were removed in vacuo and remaining crude materials were thoroughly washed with pentane. The final materials were dried under vacuum to obtain a colorless crystalline solid of (Me$_3$Si)CH$_2$CpLi in 5.75 g (99.7%) yield. $^1$H NMR (400 MHz, THF-ds): 6-0.09 (9H, s, Si—CH$_3$), 1.84 (2H, s, Me$_3$Si—CH$_2$), 5.36 (2H, t, J$_{HH}$=2.6 Hz, Cp-H), 5.47 (2H, t, J$_{HH}$=2.6 Hz, Cp-H) ppm.

Synthesis of Dimethylsilyl-bis((trimethylsilyl) methylcyclopentadiene), Me$_2$Si((Me$_3$Si)CH$_2$CpH)$_2$ A neat Me$_2$SiCl$_2$ (340 mg, 2.6 mmol) was dissolved in 10 mL of THF and cooled to −25° C. A solid lithium (trimethylsilyl) methylcyclopendienide was added to the above mixture and the resulting mixture was stirred overnight at room temperature to ensure completion of the reaction. Volatiles from the reaction mixture were removed in vacuo and subsequently triturated with pentane to remove trace of THF. The crude materials were extracted into pentane and followed by solvent removal under vacuum afforded a thick yellow viscous oil of Me$_2$Si((Me$_3$Si)CH$_2$CpH)$_2$ in 750 mg (80%) yield. $^1$H NMR (400 MHz, C$_6$D$_6$): 6-0.15 (6H, bs, SiMe$_2$-CH$_3$), 0.05 (18H, s, SiMe$_3$-CH$_3$), 1.81-1.87 (4H, m, Me$_3$Si—CH$_2$), 3.26 (1H, s, Cp-H), 3.37 (1H, s, Cp-H), 5.99-6.82 (6H, m, Cp-H) ppm.

Synthesis of Lithium dimethylsilyl-bis((trimethylsilyl) methylcyclopentadienide) dimethoxyethane complex, Me$_2$Si((Me$_3$Si)CH$_2$Cp)$_2$Li$_2$-dme A hexane solution of n-butyl lithium (1.7 mL, 4.2 mmol, 2.5 M solution) was added drop-wise to a precooled solution of Me$_2$Si((Me$_3$Si)CH$_2$CpH)$_2$ (750 mg, 2.1 mmol) in 10 mL of dimethoxyethane over a period of 5-10 minutes at −25° C. The resulting mixture was gradually warmed to room temperature and then continuously stirred overnight. Volatiles from the reaction mixture were removed in vacuo, and triturated with pentane to remove DME. The crude materials were thoroughly washed with pentane to remove any soluble impurities, and dried under vacuum to give the colorless crystalline solid of Me$_2$Si((Me$_3$Si)CH$_2$Cp)$_2$Li$_2$-dme in 830 mg (93%) yield. $^1$H NMR (400 MHz, THF-ds): δ 0.2 (18H, s, SiMe$_3$-CH$_3$), 0.93 (6H, bs, SiMe$_2$-CH$_3$), 2.26 (4H, s, Me$_3$Si—CH$_2$), 2.57 (4H, s, dme-CH$_2$), 2.77 (6H, s, dme-OCH$_3$), 5.94-6.15 (6H, m, Cp-H) ppm.

Synthesis of Rac-meso-dimethylsilyl-bis((trimethylsilyl) methylcyclopentadienide)hafnium dichloride, Me$_2$Si((Me$_3$Si)CH$_2$Cp)$_2$HfCl$_2$ A solid HfCl$_4$ (570 mg, 1.8 mmol) was added to a precooled diethyl ether (20 mL) solution of Me$_2$Si((Me$_3$Si) CH$_2$Cp)$_2$Li$_2$-dme (830 mg, 1.8 mmol) at −25° C. The resulting mixture was stirred overnight at room temperature. Volatiles from the reaction mixture were removed in vacuo, and then extracted into dichloromethane. Solvent removal under vacuum gave a yellow crystalline solid of Me$_2$Si ((Me$_3$Si)CH$_2$-Cp)$_2$HfCl$_2$ in 1.02 g (94%) yield. The $^1$H NMR spectrum of final material integrated a ~1:1 ratio of rac/meso isomers. $^1$H NMR (400 MHz, CD$_2$Cl$_2$): 6-0.05 (18H, s, SiMe$_3$-CH$_3$), −0.04 (18H, s, SiMe$_3$-CH$_3$), −0.64 (3H, s, SiMe$_2$—CH$_3$, meso), −0.65 (6H, s, SiMe$_2$-CH$_3$, rac), −0.68 (3H, s, SiMe$_2$-CH$_3$, meso), 2.08-2.18 (8H, m, Me$_3$Si—CH$_2$), 5.14 (2H, t, J$_{HH}$=2.6 Hz, Cp-H), 5.28 (2H, t, J$_{HH}$=2.6 Hz, Cp-H), 5.64 (2H, t, J$_{HH}$=2.7 Hz, Cp-H), 5.77 (2H, t, J$_{HH}$=2.7 Hz, Cp-H), 6.19 (2H, t, J$_{HH}$=2.7 Hz, Cp-H), 6.34 (2H, t, J$_{HH}$=2.7 Hz, Cp-H) ppm.

Synthesis of Rac-meso-dimethylsilyl-bis((trimethylsilyl) methylcyclopentadienide)hafnium dimethyl, Me$_2$Si((Me$_3$Si)CH$_2$Cp)$_2$HfMe$_2$ An ethereal solution of MeMgBr (1.12 mL, 3.34 mmol) was added drop wise to a precooled diethyl ether solution of Me$_2$Si((Me$_3$Si)CH$_2$-Cp)$_2$HfCl$_2$ (1.01 g, 1.65 mmol) over a period of 3-5 minutes at −25° C. The resulting mixture was stirred overnight at room temperature to ensure completion of the reaction. Insoluble materials were filtered through a pad of celite. Volatiles from the filtrate were removed under vacuum, and then the crude materials were extracted into pentane. Solvent removal in vacuo afforded a sticky yellow material of Me$_2$Si((Me$_3$Si)CH$_2$-Cp)$_2$HfMe$_2$ in 660 g (71%) yield. The $^1$H NMR spectrum of final material integrated a ~1:1 ratio of rac/meso isomers. $^1$H NMR (400 MHz, C$_6$D6): δ −0.25 (3H, s, Hf—CH$_3$, meso), 6-0.24 (6H, s, Hf—CH$_3$, rac), 6-0.20 (3H, s, Hf—CH$_3$, meso), 0.03 (18H, s, SiMe$_3$-CH$_3$), 0.04 (18H, s, SiMe$_3$-CH$_3$), 0.19 (3H, s, SiMe$_2$-CH$_3$, meso), 0.20 (6H, s, SiMe$_2$-CH$_3$, rac), 0.22 (3H, s, SiMe$_2$-CH$_3$, meso), 2.06 (4H, s, Me$_3$Si—CH$_2$, rac), 2.09 (4H, d, J$_{HH}$=3.1 Hz, Me$_3$Si—CH$_2$, meso), 5.03 (2H, t, J$_{HH}$=2.2 Hz, Cp-H), 5.10 (2H, t, J$_{HH}$=2.2 Hz, Cp-H), 5.34 (2H, t, J$_{HH}$=2.6 Hz, Cp-H), 5.44 (2H, t, J$_{HH}$=2.6 Hz, Cp-H), 6.26 (2H, t, J$_{HH}$=2.6 Hz, Cp-H), 6.31 (2H, t, J$_{HH}$=2.6 Hz, Cp-H) ppm.

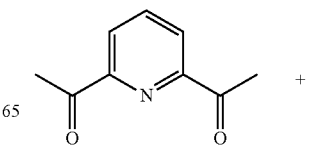

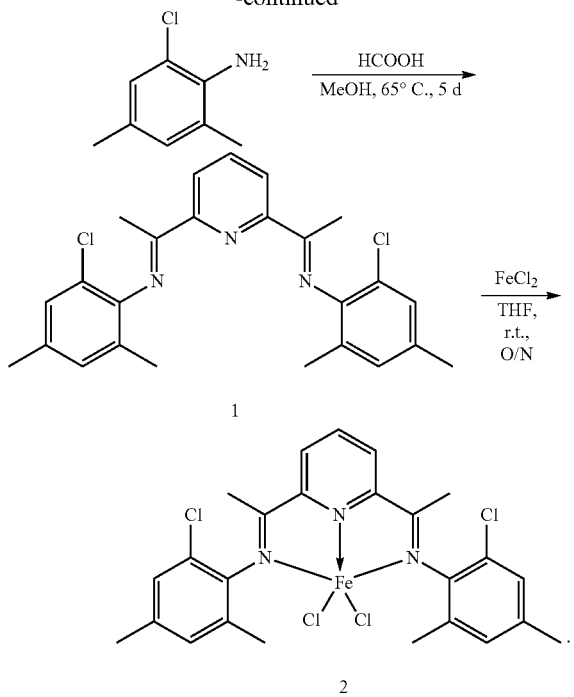

(1E,1'E)-1,1'-(pyridine-2,6-diyl)bis(N-(2-chloro-4,6-dimethylphenyl)ethan-1-imine) (1)

In the drybox, 2-Chloro-4,6-dimethylaniline (8.66 mL, 9.52 g, 61.2 mmol) was added to a stirring solution of 2,6-Diacetylpyridine (5.00 g, 30.6 mmol) in methanol (75 mL) then formic acid (3 drops) was added. Temperature was increased to 60° C. and the mixture was stirred for 5 days at 60° C. The light yellow precipitate was collected via vacuum filtration and rinsed with cold methanol. Residual solvent was removed under vacuum. Yield: 4.43 g, 10.10 mmol, 33.02%.

(1E,1'E)-1,1'-(pyridine-2,6-diyl)bis(N-(2-chloro-4,6-dimethylphenyl)ethan-1-imine)-FeCl$_2$ (2)

In the drybox, 1 (4.26 g, 9.72 mmol) was added to a slurry of Iron(II)dichloride (1.23 g, 9.72 mmol) in tetrahydrofuran (100 mL). The resulting dark blue mixture was stirred at room temperature overnight. Pentane was added to the reaction mixture and a dark blue precipitate formed and was collected via vacuum filtration. Yield: 5.905 g, 10.45 mmol, 107.5%.

Supported Catalyst Syntheses

SMAO is methylalumoxane supported on silica ES-70 (PQ Corporation, Conshohocken, Pa.) that has been calcined at 875° C. and was prepared as follows: In a 4 L stirred vessel in the drybox methylaluminoxane (MAO) (30 wt % in toluene) is added along with 2400 g of toluene. This solution is then stirred at 60 RPM for 5 minutes. ES-70 silica that has been calcined at 875° C. was then added to the vessel. This slurry is heated at 100° C. and stirred at 120 RPM for 3 hours. The temperature was then lowered and the mixture was allowed to cool to ambient temperature over 2 hours. The stirrer was then set to 8 RPM and placed under vacuum for 72 hours. After emptying the vessel and sieving the supported MAO, 1014 g was obtained.

Supported Catalysts

Catalyst (1)

Rac-meso-dimethylsilyl-bis((trimethylsilyl) methyl-cyclopentadienide) hafnium dimethyl, Me$_2$Si ((Me$_3$Si)CH$_2$Cp)$_2$HfMe$_2$ Supported Catalyst 1: A 1.0 g amount of prepared SMAO was stirred in 10 mL of toluene using a Celstir™ flask. r/m-dimethylsilyl bis(trimethylsilylmethylene-cyclopentadienide) hafnium dimethyl (22.7 mg, 40 μmol) was added to the slurry and stirred for three hours. The mixture was filtered, washed with several 10 mL portions of hexane and then dried under vacuum, yielding 0.87 g of white silica.

Catalyst (2)

(1E,1'E)-1,1'-(pyridine-2,6-diyl)bis(N-(2-chloro-4,6-dimethylphenyl)ethan-1-imine)-FeCl$_2$ Supported Catalyst 1:2

A 1.0 g amount of prepared SMAO was stirred in 10 mL of toluene using a Celstir™ flask. Dimethylsilyl bis(trimethylsilylmethylene-cyclopentadienide)hafnium dimethyl (18.1 mg, 0.032 mmol) and 2,6-Bis[1-(2-chloro-4,6-dimethylphenylimino)ethyl]pyridine iron(II) dichloride (4.5 mg, 0.008 mmol) were added to the slurry and stirred for three hours. The mixture was filtered, washed with several 10 mL portions of hexane and then dried under vacuum, yielding 0.90 g of light yellow silica.

Polymerization Process with Supported Catalyst Systems

Polymerization processes were performed using the catalyst system prepared above in an gas-phase fluidized bed reactor. Cycle and feed gases were fed into the reactor body through a perforated distributor plate, and the reactor was controlled at 300 psi and 70 mol % ethylene. The reactor temperature was maintained at 185° F. throughout the polymerization by controlling the temperature of the cycle gas loop. The catalyst system as described above was delivered in a paraffin wax slurry containing 10 wt % supported catalyst. Overall, the catalyst 1:catalyst 2 pair at an 80:20 ratio showed that the bridged hafnocene and the iron iminopyridine catalysts both show high activity/productivity when cosupported and have different hexene responses. The iron catalyst shows little hexene response, while the hafnocene has a strong hexene response. Over 90 lbs of PE was collected for film analysis. At this temperature and these conditions, the overall composition and molecular weight distribution resulted in an MIR of 24.3. The relative molecular weight capability and comonomer incorporation of these two catalysts create a polymer product that can be tuned by adjusting catalyst ratio and reactor conditions. Details regarding the process and product are shown in Table 2, Table 3, Table 4, and Table 5. The process conditions were varied to obtain and demonstrate a balance of properties, for example, high stiffness and toughness, good sealing performance, and good optical properties such as haze and gloss. The catalyst 1: catalyst 2 pair is capable of producing a BOCD polymer product displaying improvements in certain properties such as stiffness. The hydrogen and ethylene ratios were measured by on-line GC analysis (Table 2). Results are shown in Table 3. The data illustrate that the mixed catalyst system of Catalyst 1: catalyst 2 provides a bimodal polyethylene composition as illustrated by the TREF curve and Mw/Mn value of 8.14. In addition, the polyethylene composition has high linearity as indicated by g'(vis) of 0.993. Furthermore, hexene incorporation is greater than 9 wt % and productivity is greater than 3,000 gP/gsup. Cat. Compositionally, the high vinyl selectivity can prove unique for BOCD PE compositions, Table 5. Furthermore, these PE's have high selectivity towards vinyl unsaturations in the molecular architecture with BOCD as measured by GPC 4D and CFC analysis (FIG. 1). FIG. 1 illustrates representative bimodal molecular weight distribution curves. As shown in FIG. 1, there is a valley between peaks, and the peaks can be separated or deconvoluted. The PE composition of FIG. 1 has a bimodal molecular weight distribution characterized as having a high molecular weight component (or distribution) and a low molecular weight component (or distribution).

TABLE 2

| Catalyst # | Cat. 1:Cat 2 (80:20) |
|---|---|
| PROCESS DATA | |
| H2 conc. (molppm) | 392 |
| C6/C2 Gas Ratio (mol %/mol %) | 0.014 |
| Comonomer conc. (mol %) | 0.95 |
| C2 conc. (mol %) | 69.9 |
| Comonomer/C2 Flow Ratio (g/g) | 0.055 |
| H2/C2 Ratio | 5.6 |
| Rx. Pressure (psig) | 300 |
| Reactor Temp (F.) | 185 |
| Residence Time (hr) | 5.0 |
| Cat Productivity (g poly/g cat) | 3103 |
| PRODUCT DATA | |
| Melt Index (MI) | 0.94 |
| HLMI | 23.84 |
| HLMI/MI Ratio | 25.30 |
| Gradient Density | 0.9207 |
| Bulk Density | 0.33 |

TABLE 3

Slurry Phase Polymerization of Ethylene and 1-Hexene

| Example | Supported Catalyst | MI dg/min | MIR | Mw g/mol | Mn g/mol | Mw/Mn | Productivity gP/gsup. Cat. | Hexene wt % | g'(vis) |
|---|---|---|---|---|---|---|---|---|---|
| 1 | Catalyst 1:Catalyst 2 | 0.94 | 24.30 | 123577 | 15182 | 8.14 | 3103 | 9.90 | 0.993 |

TABLE 4

Gas Phase Polymerization of Ethylene and 1-Hexene

| Example | Supported Catalyst | MI dg/min | MIR |
|---|---|---|---|
| 1 | Catalyst 1:Catalyst 2 | 0.94 | 24.30 |

TABLE 5

Level of Unsaturation (Internal (I) and Terminal (T)) for Polyethylenes

| Unsaturations per 1000 C | Catalyst 1:2 |
|---|---|
| Vy1 and Vy2 (I) | 0.10 |
| Vy5 (T) | 0.05 |
| Tri-substituted olefins (I) | 0.07 |
| Vinyls (T) | 0.46 |

TABLE 5-continued

Level of Unsaturation (Internal (I) and Terminal (T)) for Polyethylenes

| Unsaturations per 1000 C | Catalyst 1:2 |
|---|---|
| Vinylidenes (T) | 0.02 |
| total internal unsaturations | 0.17 |
| Total unsaturations | 0.7 |
| % vinyl of total unsaturations | 65.7 |
| % internal of total unsaturations | 24.3 |
| Ratio of vinyls/internals | 2.7 |

Film Production

Blown film evaluations of the polymers as prepared and described above were carried out on a 2" extruder equipped with a 2" spiral mandrel die operated at a die throughput rate of 8 lbs/hr/die inch using a melt temperature of 370° F.-380° F. and 3.0 BUR. Film properties at 1.0 mil gauge are summarized below in Table 6.

TDA is the total defect area. It is a measure of defects in a film specimen, and reported as the accumulated area of defects in square millimeters ($mm^2$) normalized by the area of film in square meters ($m^2$) examined, thus having a unit of ($mm^2/m^2$) or "ppm". In Table 6, only defects with a dimension above 200 microns are reported.

TDA is obtained by an Optical Control System (OCS). This system consists of a small extruder (ME20 2800), blown film die, chill roll unit (Model CR-9), a winding system with good film tension control, and an on-line camera system (Model FSA-100) to examine the cast film generated for optical defects. The typical testing condition for the blown film generation is given below:

Extruder temperature setting (° C.): Feed throat/Zone 1/Zone 2/Zone 3/Zone4/Die: 70/190/200/210/215/215
Extruder speed: 50 rpm
Chill roll temperature: 30° C.
Chill roll speed: 3.5 m/min The system generates a cast film of about 4-5 inches in width and a nominal gauge of 1 mil. Melt temperature varies with materials, and can be around 215° C.

The PE resin was pelletized and film was blown at 4 different film gauges. It is particularly noteworthy that the rates for film blowing were maxed out (winder speed) on the equipment with no signs of bubble instability. This observation indicates a promising processability.

A combination of high dart and stiffness was observed at 3.0 blow up ratio (BUR) (Table 6). By using the mixed catalyst system Hf (catalyst 1): Fe (catalyst 2), to produce the resin used to make the films, a combination of Dart 706 g/mil (Dart method A) and Modulus of 46648 psi (avg. of MD and TD), was obtained for a density of PE resin of 0.9207 and 1.04 mil gauge (Table 7). Similarly, a 0.77 mil film was obtained in which 984 g/mil Dart A and 214 g/mil MD Tear was obtained.

TABLE 6

| | Cat 1:Cat 2 (80:20) |
|---|---|
| Catalyst | |
| Density (g/cm$^3$) | 0.9207 |
| $I_2$ (g/10 min) | 1.0 |
| $I_{21}$ (g/10 min) | 24.5 |
| MIR | 25.5 |
| TDA (ppm) > 200 micron | |
| Films made and testing | |
| 3 mil | Film 1 |
| 1.04 mil | Film 2 |
| 0.77 mil | Film 3 |
| 0.6 mil | Film 4 |
| 0.56 mil | Film 5 |
| 0.47 mil | Film 6 |
| 1 mil Film Barcode # | Film 2 |
| Gauge Mic (mils) | |
| Average | 1.04 |
| Low | 0.85 |
| High | 1.19 |
| 1% Secant (psi) | |
| MD | 40620.0 |
| TD | 52677.0 |
| AVG | 46648.5 |
| Tensile Yield Strength (psi) | |
| MD | 1608.00 |
| TD | 1934.00 |
| Elongation @ Yield (%) | |
| MD | 5.7 |
| TD | 5.1 |
| Tensile Strength (psi) | |
| MD | 8905 |
| TD | 8499 |
| Elongation @ Break (%) | |
| MD | 389 |
| TD | 587 |
| Elmendorf Tear | |
| MD (g) | 160 |
| TD (g) | 671.4 |
| MD (g/mil) | 153.8 |
| TD (g/mil) | 645.6 |
| Haze- internal (%) | 3.7 |
| Haze (%) | 8.19 |
| Gloss | |
| MD | 67.0 |
| TD | 68.5 |
| Dart Drop | |
| Phenolic | |
| Method A | |
| (g) | 734 |
| (g/mil) | 706.0 |
| Puncture (ExxonMobil probe) | |
| Peak Force (lbs) | 11.6 |
| Peak Force (lbs/mil) | 11.1 |
| Break Energy (in-lbs) | 31.8 |
| Break Energy (in-lbs/mil) | 30.6 |

TABLE 7

MD Tear and Dart (A) as a function of film gauge
D 0.9207 g/cm$^3$
Film 4

| Film BCT# | Gauge, mil | MD Tear, g/mil | Dart, g/mil |
|---|---|---|---|
| Film 1 | | | |
| Film 2 | 1.04 | 153.8 | 706 |
| Film 3 | 0.77 | 214.3 | 984 |
| Film 4 | 0.6 | 137.2 | 221 |
| Film 5 | 0.56 | 223.2 | 245 |
| Film 6 | 0.47 | 423.4 | 221 |

Figure 2:
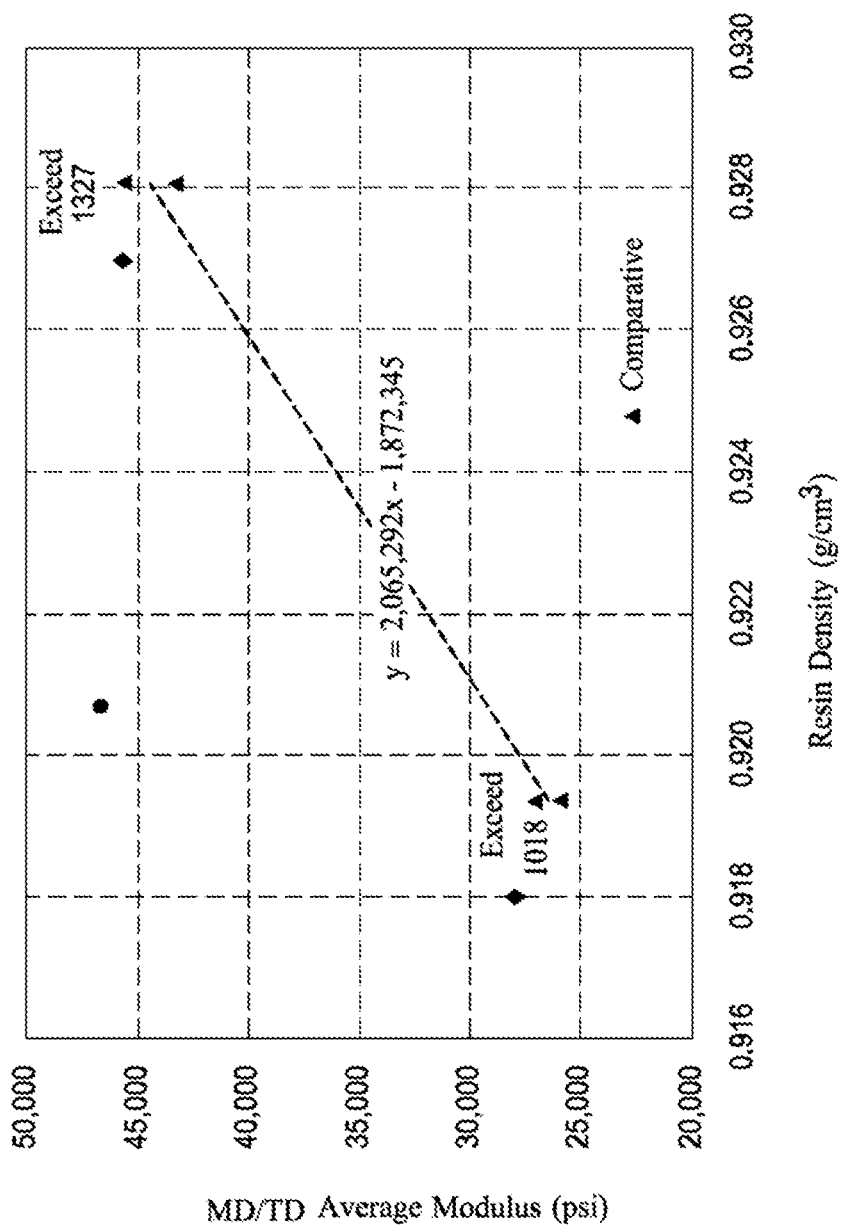
FIG. 2 is a graph illustrating stiffness versus density of polyethylene films, according to one embodiment.

FIG. 2 is a graph illustrating stiffness versus density of PE films of the present disclosure. The following equation shows the film modulus dependence of comparative examples on its resin density. All the inventive examples exhibited a substantial advantage in film stiffness at a given resin density.

Average Modulus=Constant 1($C1$)*Density−Constant 2($C2$)

In a class of embodiments, the film exhibits a relationship between average of the MD and TD 1% secant modulus and density satisfying the following equation:

Avg.Modulus≥1.2*($C1$*Density−$C2$);

and, in particular as an example,

Average Modulus≥1.2*(2,065,292*Density−1,872,345).

A good balance of various performance attributes has been an important goal in the development of new polyethylene compositions. For LLDPE film applications and products, key performance attributes include one or more of stiffness, toughness, optical properties, and processability. For some LLDPE film applications, sealing performance is also important. Sealing performance is affected mainly by density. Sealing performance generally improves as density gets lower but density typically has the opposite effect on stiffness. Therefore, to achieve a balanced performance, there is usually a trade-off between stiffness and sealing performance.

In particular, for polyethylene compositions, the molecular weight and distribution and comonomer distribution interdependence (e.g., MWD×CD), has a strong effect on sealing performance, with narrow CD resin made from metallocene catalysts outperforming broad CD resin by conventional catalysts. To improve sealing performance while maintaining good stiffness is difficult. As demonstrated above, the dual or mixed catalyst system providing BCD and BOCD benefits yield PE LLDPE films with the a combination of high stiffness and good sealing performance, as well as good optical properties.

In addition, catalyst systems of the present disclosure can provide increased activity or enhanced polymer properties, to increase conversion or comonomer incorporation, or to alter comonomer distribution. Catalyst systems and processes of the present disclosure can provide ethylene polymers having the unique properties of high stiffness, high toughness and good processability.

All documents described herein are incorporated by reference herein, including any priority documents and/or testing procedures to the extent they are not inconsistent with this text. As is apparent from the foregoing general description and the specific embodiments, while embodiments of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I"" preceding the recitation of the composition, element, or elements and vice versa, e.g., the terms "comprising," "consisting essentially of," "consisting of" also include the product of the combinations of elements listed after the term. While the disclosure has been described with respect to a number of embodiments and examples, those skilled in the art, having benefit of this disclosure, will appreciate that other embodiments can be devised which do not depart from the scope and spirit of the disclosure as disclosed herein.

What is claimed is:

1. A film comprising:
 a polyethylene composition, comprising:
  an ethylene content and from 0 to 25 mol % of a $C_3$-$C_{40}$ olefin comonomer content, based upon the total molar content of the polyethylene composition, the polyethylene composition having a total internal plus terminal unsaturation greater than 0.7 unsaturations per 1000 carbon atoms, and further having terminal unsaturations of 50% or more of the total unsaturations,
 wherein the film has:
  an Elmendorf Tear value in the machine direction of from 10 g/mil to 300 g/mil, and
  a Dart Drop Impact of from 100 g/mil to 1,100 g/mil.

2. The film of claim 1, wherein the polyethylene composition has a density from 0.900 to 0.940 g/cc.

3. The film of claim 1, wherein the polyethylene composition has a g'vis of 0.97 or greater.

4. The film of claim 1, wherein the polyethylene composition has a g'vis of 0.99 or greater.

5. The film of claim 1, wherein the polyethylene composition has a $T_{75}$-$T_{25}$ greater than 20° C.

6. The film of claim 1, wherein the polyethylene composition has a vinyl content of greater than 50% of the total unsaturation.

7. The film of claim 1, wherein the polyethylene composition has a terminal unsaturation: internal saturation ratio of from 1 to 4.

8. The film of claim 1, wherein the polyethylene composition has an RCI,m of from 50 to 100.

9. The film of claim 1, wherein the polyethylene composition comprises from 6 mol % to 10 mol % of comonomer content.

10. The film of claim 1, wherein the $C_3$-$C_{40}$ olefin comonomer is hexene.

11. The film of claim 1, wherein the polyethylene composition has an Mw/Mn value of from 6 to 9.

12. The film of claim 1, wherein the polyethylene composition has a melt index ratio ($I_{21}/I_2$) of from 20 to 40.

13. The film of claim 1, wherein the film has one or more of the following properties:
 an average of the MD and TD 1% secant modulus of from 35,000 psi to 60,000 psi;
 a Dart Drop Impact of from 400 g/mil to 1,000 g/mil;
 an Elmendorf Tear value in the machine direction of from 50 g/mil to 250 g/mil;
 an Elmendorf Tear value in the transverse direction of from 400 g/mil to 1,000 g/mil;
 a Tensile Strength in the machine direction of from 3,000 psi to 12,000 psi;
 a Tensile Strength at Yield in the machine direction of from 500 psi to 3,000 psi;
 a Tensile Strength at Yield in the transverse direction of from 1,000 psi to 3,000 psi; and
 an Elongation at Break in the machine direction of from 200% to 600%.

14. The film of claim 1, wherein the film has a haze of from about 7% to about 11%.

15. The film of claim 1, wherein the film is a blown film or a cast film.

16. A process for forming the film of claim 1, the process comprising:
 extruding the polyethylene composition through a die at a die rate of from 0.3 kg/mm-hr to 2 kg/mm-hr and obtaining the film.

* * * * *